United States Patent
Shelton et al.

(10) Patent No.: US 6,418,471 B1
(45) Date of Patent: Jul. 9, 2002

(54) METHOD FOR RECORDING AND REPRODUCING THE BROWSING ACTIVITIES OF AN INDIVIDUAL WEB BROWSER

(75) Inventors: James A. Shelton, Holmdel, NJ (US); Michael I. Ingrassia, Jr., Dallas, TX (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/151,907

(22) Filed: Sep. 11, 1998

Related U.S. Application Data

(63) Continuation-in-part of application No. 08/944,124, filed on Oct. 6, 1997, now Pat. No. 5,951,643.

(51) Int. Cl.[7] .............................................. G06F 13/00
(52) U.S. Cl. ...................................................... 709/227
(58) Field of Search .................................. 709/224, 227, 709/245, 204, 205, 217, 218; 707/5, 104

(56) References Cited

U.S. PATENT DOCUMENTS

| | | | | | |
|---|---|---|---|---|---|
| 5,761,436 | A | * | 6/1998 | Nielsen | 709/245 |
| 5,809,250 | A | * | 9/1998 | Kisor | 709/227 |
| 5,845,290 | A | * | 12/1998 | Yoshii | 707/104 |
| 5,951,643 | A | * | 9/1999 | Shelton et al. | 709/227 |
| 5,960,429 | A | * | 9/1999 | Peercy et al. | 707/5 |
| 6,035,332 | A | * | 3/2000 | Ingrassia, Jr. et al. | 709/224 |
| 6,052,730 | A | * | 4/2000 | Felciano et al. | 709/225 |

* cited by examiner

Primary Examiner—Robert B. Harrell
(74) Attorney, Agent, or Firm—James M. Stover

(57) ABSTRACT

A mechanism for recording browser activities performed at a first web browser and subsequently replaying the recorded browser activities at one or more web browsers. The browsing activities can be recorded together with time references corresponding to various browsing activities such as when a web page is retrieved, or the length of time a page is displayed. The browsing activities can be replayed in accordance with the recorded time references. If desired, the browsing activities that are being repeated can be synchronized among multiple browsers.

5 Claims, 20 Drawing Sheets

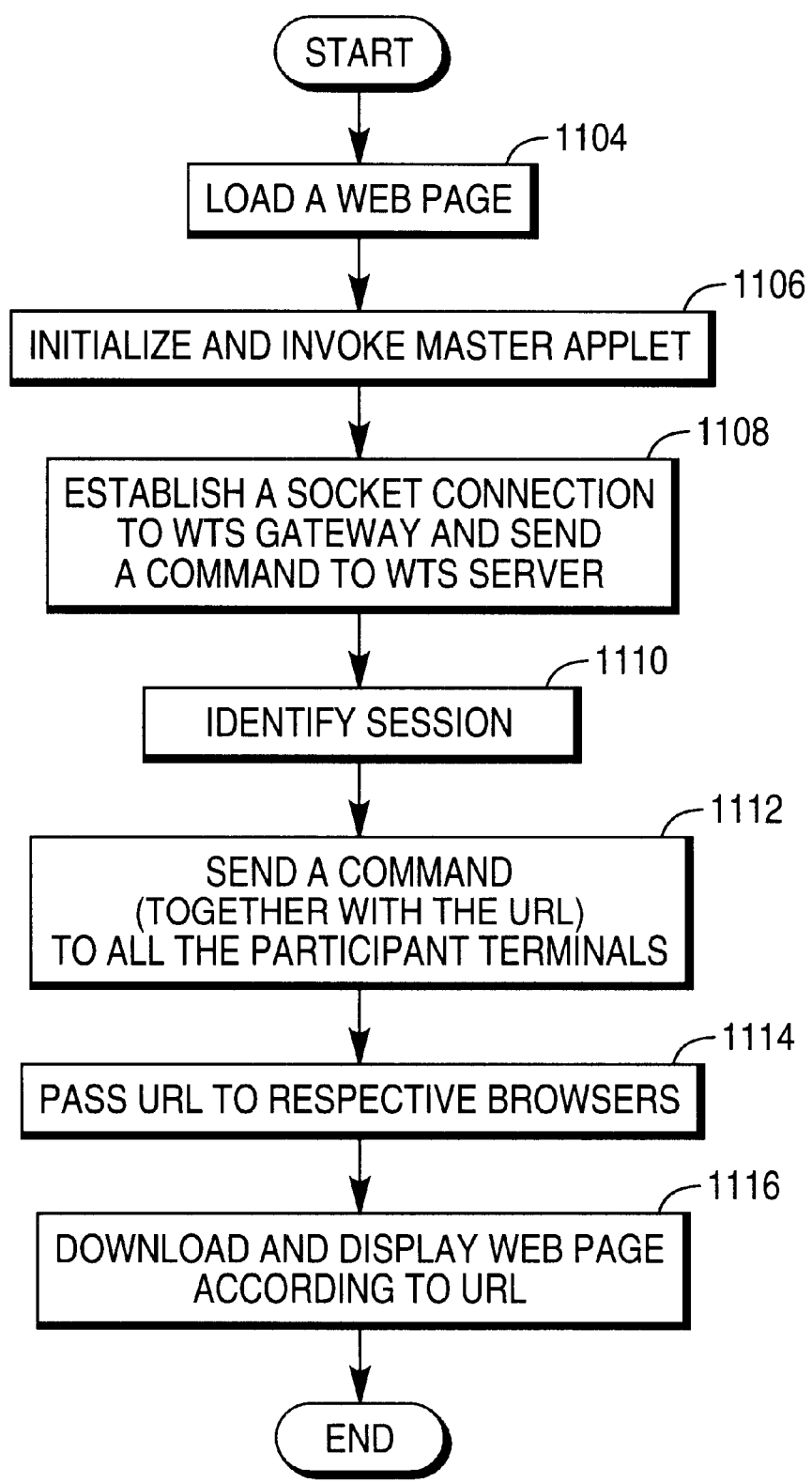

FIG. 12A

TELEPHONE BILL

| | | |
|---|---|---|
| Name | Susan King | ←1202 |
| Time Period | 07/01/95 - 08/01/95 | ←1204 |
| Account Balance | $100.00 | ←1206 |
| Payment | | ←1208 |
| Comments | | ←1210 |
| SessionID | 1234567 | ←1212 |
| Call Center Number | 1-800-456-7777 | ←1214 |

1200

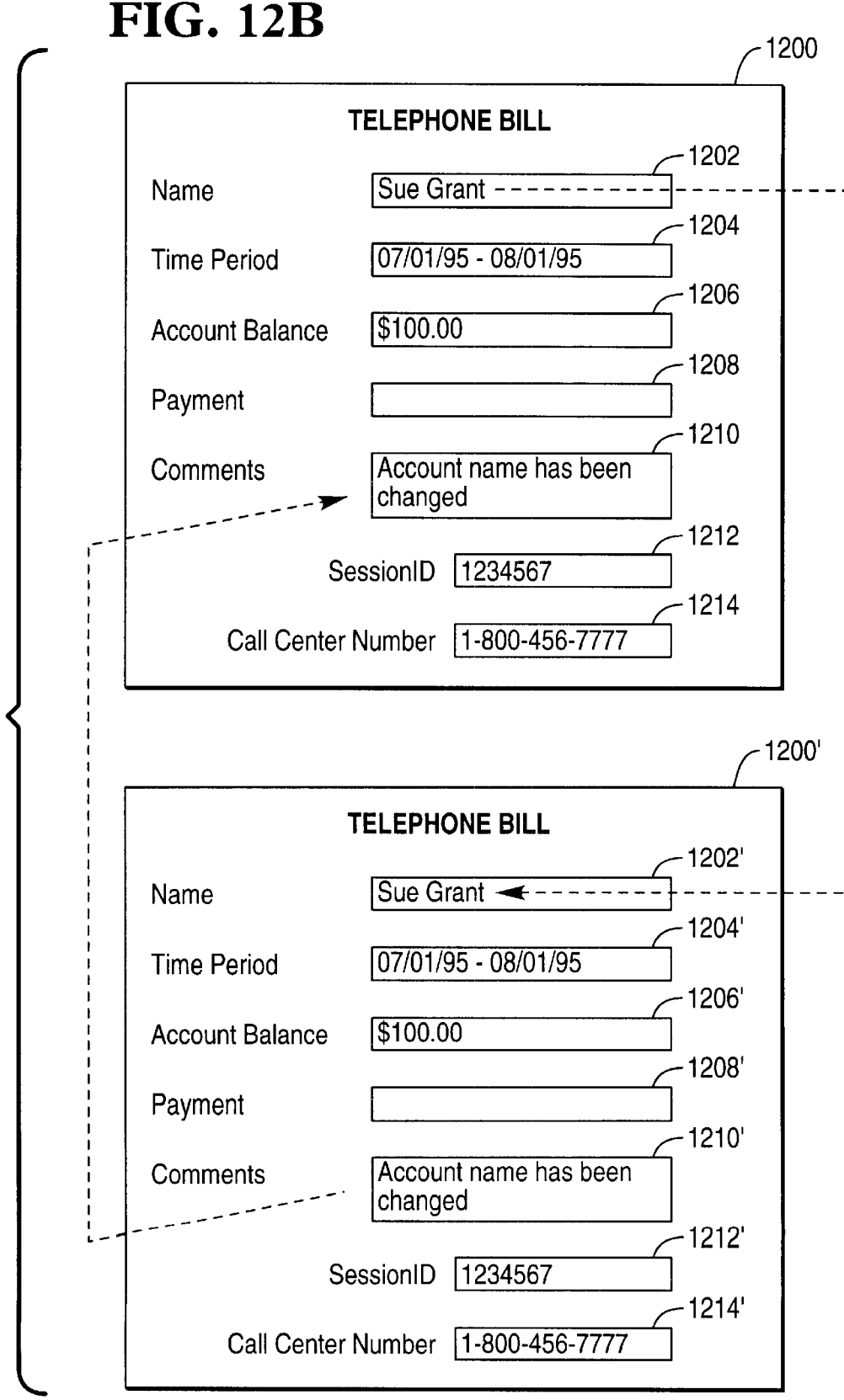

METHOD FOR RECORDING AND REPRODUCING THE BROWSING ACTIVITIES OF AN INDIVIDUAL WEB BROWSER

RELATED APPLICATIONS

This is a continuation-in-part of application Ser. No. 08/944,124 filed Oct. 6, 1997, now U.S. Pat. No. 5,951,643.

The present invention relates generally to a method and system for recording and reproducing the activities performed by an individual web browser.

BACKGROUND OF THE INVENTION

Web browsers, such as Microsoft Corporation's Internet Explorer internet browser and Netscape Communications Corporation's Navigator™ internet browser, provide a graphical, easy-to-navigate interface for retrieving and viewing information available from the Web. The World Wide Web utilizes a system known as a hypertext system to facilitate navigation through the World Wide Web environment. The hypertext system employs special connections, or links, which are embedded into documents displayed through use of internet browser software. Clicking on a word, phrase, image or thumbnail graphic including one of these links instructs the browser to retrieve a document, graphic, sound, or other information associated with the embedded link.

Documents published electronically in hypertext form, i.e., documents constructed utilizing Hypertext Markup Language (HTML), are becoming a defacto standard for sharing information online. HTML is a language for describing structured documents. Documents written in HTML are ASCII text documents including: (1) the text of the document, and (2) HTML tags that identify document elements, formatting and structure, as well as links to graphic files, other documents, or other information. Browser software interprets the HTML tags included in downloaded documents to properly display the text and referenced elements. Images and other referenced elements are not normally contained in the downloaded document, however, and must be separately downloaded in order to completely display the HTML document and referenced elements.

Documents, also referred to as web pages, as well as the image files, additional document files and other elements referenced in the web pages may be maintained on one or multiple web servers remote from the user retrieving and viewing the web pages. With the development of information technology and networking infrastructure, more and more businesses, government agencies, universities and individuals maintain web sites and conduct business over the Internet. For example, a service provider can display its service in a set of web pages maintained on a web server owned by the provider.

To improve the service and assistance provided to consumers using the Internet, it is desirable to provide a mechanism to record the detailed browsing activities of an individual browser, or to force a browser to reproduce the browser activities recorded at one or more browsers. The ability to record and reproduce browser activities is useful in a variety of applications such as consumer behavior analysis, quality assurance, and training applications.

One difficulty in achieving the above objectives is that web servers are designed to serve each individual web browsers in a stateless manner where one browser request has no relationship to previous or subsequent requests. In processing of requests, a web site has no control over the sequences of the requests.

Currently it is very difficult to accurately capture the browsing activities of a person visiting a web site. Analyzing page requests received by a web server does not accurately reflect the actual sequence of pages visited by an individual browser. This is because:

Web pages retrieved by a browser from browser cache or a proxy server will not be recorded as a page request on the web server.

A web server does not record the timing characteristics of a user's interaction with a form because this interaction is handled directly by the web browser. The final state of the data entered into a form is sent by the browser to the web server when the form is submitted.

Because of the limited quality (granularity) of data maintained by the server, it is currently not possible for a server-based application to reproduce the sequence of activities performed by a specific browser. Web servers currently record statistics on each page requested, but do not reliably keep track of each page that is displayed at a user's browser, or record page requests retrieved from the browser's cache or a proxy server. Nor does the web server currently record browser activities including the timing of each data entry into an HTML form. There are no known tools that are capable of recording detailed browser activities and then later providing a mechanism to replay the same sequence of browser activities through one or more browsers.

OBJECTS OF THE INVENTION

It is therefore an object of the present invention to provide a new and useful mechanism to record the detailed browsing activities of an individual browser—regardless of whether the information displayed by the browser was obtained from browser cache, proxy server cache or a web server.

It is another object of the present invention to provide such a mechanism which includes the ability to store each URL request and each piece of data entered into an HTML form along with a time stamp to keep track of when each of the browser activities took place.

It is a further object of the present invention to provide a new and useful mechanism to force a browser to reproduce a recorded set of browser activities at one or more browsers.

It is yet another object of the present invention to provide such a mechanism wherein the set of recorded browser activities can be reproduced at the same rate as the original browser activities, or can be reproduced at proportionately slower or faster rates.

It is an additional object of the present invention to provide such a mechanism wherein the playing of a sequence of web pages may be started, stopped or paused at any URL in the sequence of pages recorded.

SUMMARY OF THE INVENTION

In one aspect, the present invention provides a method for repeating browsing activities performed by a customer or user. The method comprises the steps of: (a) recording browsing activities as they are performed at a first terminal; (b) retrieving to a second terminal the browsing activities recorded at the first terminal; and (c) repeating at the second terminal the browsing activities recorded at the first terminal.

The present invention further provides a method for recording the activities of a number of customers using a browser and then selecting one browser session for replay at another browser. The method comprises the steps of: (a) browsing web pages at a plurality of user browsers; (b) creating a plurality of sessions at a network server, each of said sessions being associated with a respective one of said plurality of user browsers; (c) recording the browsing activities for each of the user browsers into an associated session at said network server; (d) selecting one of the sessions; and (e) repeating activities recorded for the selected session at an administrative browser. We could also replay to more than one browser at the same time.

BRIEF DESCRIPTION OF THE DRAWINGS

The purpose and advantages of the present invention will be apparent to those skilled in the art from the following detailed description in conjunction with the appended drawing, in which:

FIG. 11 shows a flowchart illustrating the operation of web page synchronization, in accordance with the present invention.

FIG. 12A shows a web page containing five data fields, in accordance with the present invention.

FIG. 12B shows a web page that is similar to that of FIG. 12A, except that the data in one of the five data fields is changed, in accordance with the present invention.

DETAILED DESCRIPTION OF THE PREFERRED EMBODIMENT

The following description is presented to enable any person skilled in the art to make and use the invention, and is provided in the context of a particular application and its requirements. Various modifications to the preferred embodiments will be readily apparent to those skilled in the art, and the principles defined herein may be applied to other embodiments and applications without departing from the spirit and scope of the invention. Thus, the present invention is not intended to be limited to the embodiments shown, but is to be accorded with the broadest scope consistent with the principles and features disclosed herein.

Figure 1:
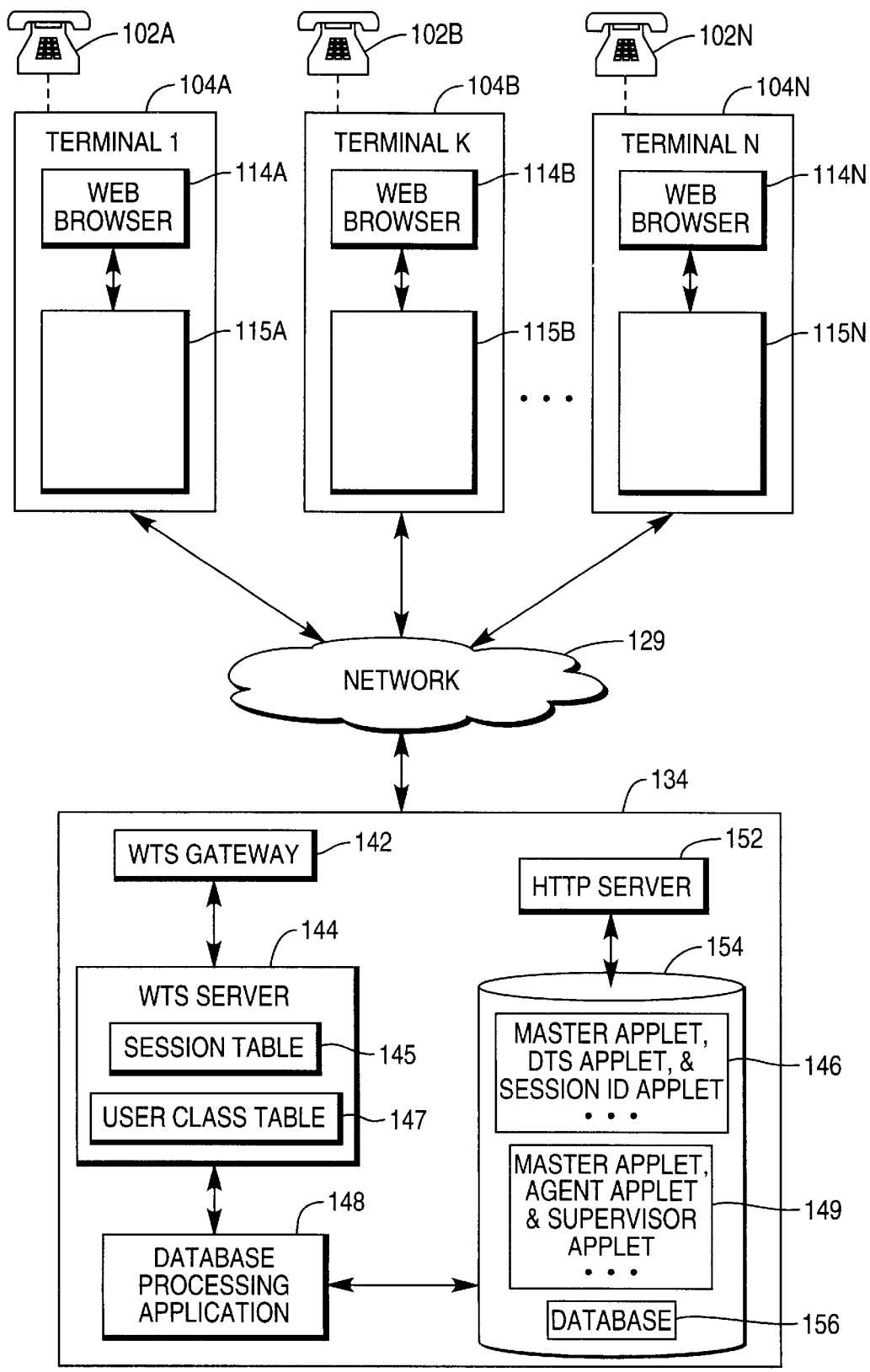
FIG. 1 shows a system includes N terminals, a network, and a web site, in accordance with the present invention.

Referring to FIG. 1, there is shown an exemplary web page tracking and synching system 100, in accordance with the present invention.

As shown in FIG. 1, the system includes N terminals 104A, 104B, . . . ,104N; a network 129 such as the Internet, or a combination of the Internet and an Intranet and a web site 134. Each of the terminals has a telephone set or an alternate means of communications such as an ip phone, chat application, etc., 102A, 102B, . . . , 102N installed in its vicinity. Each of the terminals can be a PC computer, a workstation, a Java station, or even a web TV system.

Web site 134 includes a WTS (Web Tracking and Synching) gateway 142, a WTS server 144 containing a session table 145 and a user class table 147, a database processing application 148, an HTTP (Hyper Text Transfer Protocol) server 152, and a hard disk unit 154 for storing consumer page repository 146, administration page repository 149, and database 156. All the components in web site 134 can be installed in one or distributed across one or more computer systems. Each of the computer systems includes a processing unit (which may include a plurality of processors), a memory device, and a disk unit (which may include a plurality of disk sets).

Each of the terminals 104A, 104B, . . . ,104N, includes a processor unit (not shown) and a memory area 115A, 115B, . . . , 115N, and runs a Java enabled web browser 114A, 114B, . . . ,114N. Each of the memory area 115A, 115B, . . . , 115N, is maintained by its respective browser 114A, 114B, . . . , 114N. Via network 129, each of the browsers 114A, 114B, . . . ,114N, is able to send requests to and receive web pages from HTTP server 152, and to display the web pages received at its respective terminal. Each of the browsers 114A, 114B, . . . ,114N, is able to run a Master Applet 124A, 124B, . . . ,124N, a set of DTS (Data Tracking and Synching) Applets, a SessionID Applet, and an Agent Applet. As shown in FIG. 1, these Applets are stored in consumer page repository 146 and can be downloaded from consumer page repository 146 and stored in the memory areas (otherwise known as browser cache) of the terminals 104A, 104B, . . . , 104N.

Figure 2:
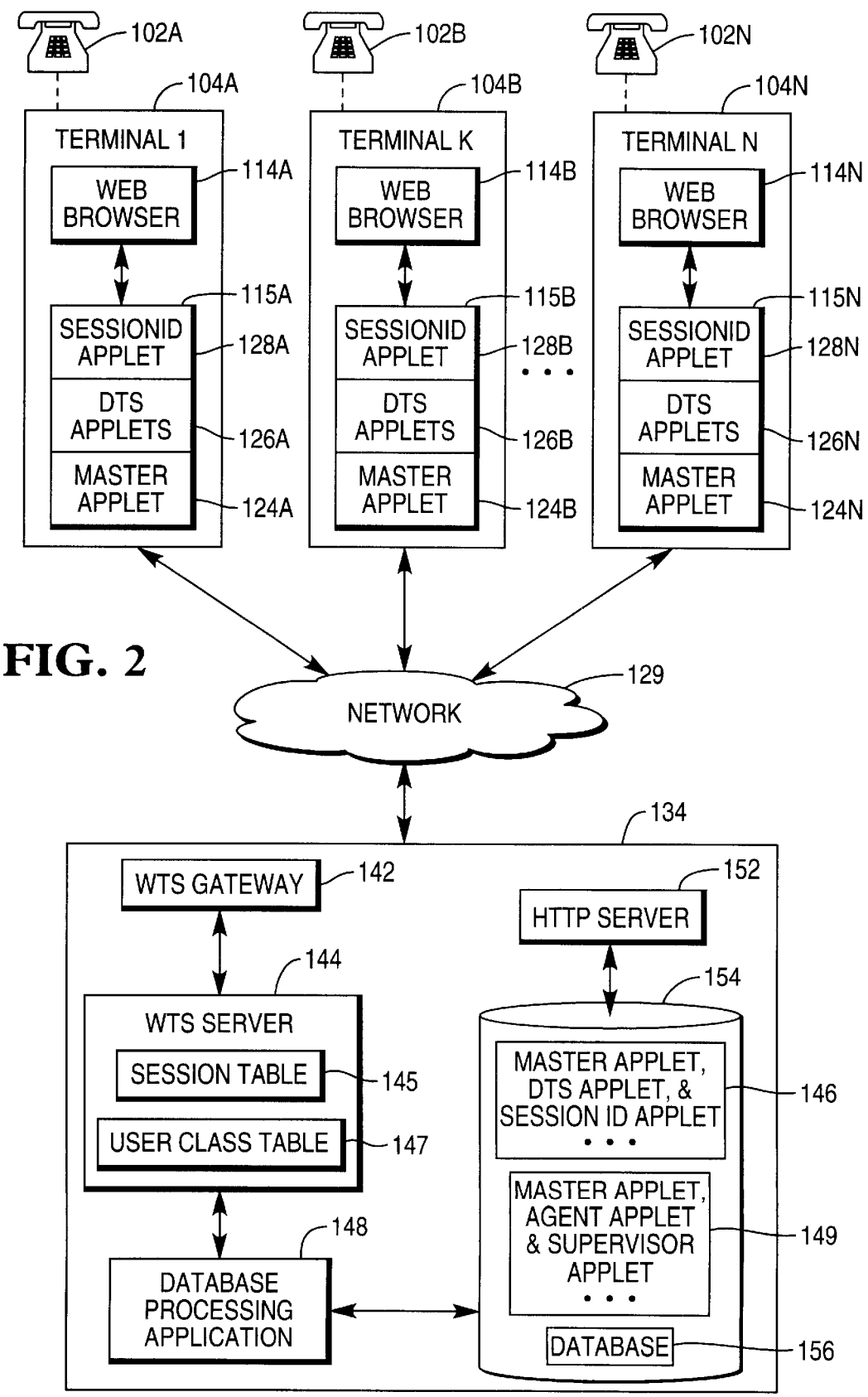
FIG. 2 shows a situation where each of the N terminals has downloaded its respective Master Applets, DTS Applets, and SessionID Applet, in accordance with the present invention.

Referring to FIG. 2, there is shown the situation where each of the terminals 104A, 104B, . . . ,104N, has downloaded its respective Master Applets 124A, 124B, . . . ,124N, DTS Applets 126A, 126B, . . . , 128N, and SessionID Applets 128A, 128B, . . . , 128N, in accordance with the present invention.

In FIG. 2, each of the (consumer) Master Applets 124A, 124B, . . . ,124N, is primarily responsible for: (1)establishing a socket connection to WTS gateway 142 via network 129 for its respective browser 114A, 114B, . . . ,114N, in response to loading each web page at its respective browser, (2) communicating with WTS server 144 via the socket connection, from which WTS server 144 is able to identify the origin, i.e., which browser, which web page, etc., of the commands and information that are being delivered through, (3) monitoring the activities of its respective browser, (4) sending the information about its respective browser's activities to WTS server 144, (5) receiving and processing the information about other browsers' activities, (6) via the socket connection, providing a single communication path to WTS server 144 for DTS Applets 126A, 126B, . . . , 126N, SessionID Applets 128A, 128B, . . . , 128N, or any other consumer Applets embedded on the same page with the Master Applet, (7) sending commands to WTS server 144 to request services, for itself and for DTS Applets 126A, 126B, . . . , 126N, SessionID Applets 128A, 128B, . . . , 128N) , or any other consumer Applets embedded on the same page with the Master Applet, and (8) sending user class information together with the commands, to indicate that its respective browser is a consumer user.

Each set of DTS Applets 126A, 126B, . . . , 126N, contains one or more individual DTS Applets, which are primarily responsible for: (1) displaying and monitoring the data activities (data inputs or data updates of data fields) on web pages that are being displayed by its respective browser, (2) sending the data activities to WTS server 144 via its respective Master Applet, (3) receiving the data activities from other browsers via its respective Master Applet, and (4) processing the data activities from other browsers for the web pages that are being displayed by its respective browser.

Each of the SessionID Applets 128A, 128B, . . . , 128N, is responsible for retrieving, and for displaying on a web page the current SessionID.

As shown in administration page repository 149, Agent Applet (or Supervisor Applet) is responsible for creating a session interface, joining, monitoring, and controlling a session through the session interface. The (administration) Master Applet is primarily responsible for: (1) opening a dedicated socket, and establishing a socket connection to WTS gateway 142 via network 129 for the session interface created by Agent Applet, Supervisor Applet, or any other administration Applets embedded on the same web page with the Master Applet, (2) communicating with WTS server 144 via the socket connection, from which WTS server 144 is able to identify the origin (i.e. from which session interface) of the commands and information that are being delivered through, (3) via the socket connection, providing a single communication path to WTS server 144 for Agent Applet, Supervisor Applet, or any other administration Applets embedded on the same web page with the Master Applet, and (4) sending user class information together with the commands, to indicate that its respective browser is an administration user.

WTS gateway 142 is responsible for maintaining all socket connections between Master Applets and WTS server 144. The connections between Master Applets and WTS gateway 142 take place using standard sockets. In the implementation described herein, the connection between WTS gateway 142 and WTS server 144 takes place using Java RMI (Remote Method Invocation). This connection could also be accomplished utilizing sockets.

WTS server 144 is responsible for: (1) managing and tracking the activities of all browsers participating in active sessions, exemplary activities including: loading of, interacting with, and unloading of web pages, (2) recording the information about the activities, (3) managing the synchronization of the activities for all browsers participating in the active sessions, (4) creating a session when a consumer user (via a browser) sends a request to web site 134 for the first time, (5) defining the session length intervals, (6) purging sessions that have been inactive for more than the specified session length intervals, (7) adding and deleting participants to a session, and (8) providing services to all commands from consumer Applets, such as: (consumer) Master Applet, DTS Applets, SessionID Applets, and administration Applets, such as: (administration) Master Applet, Agent Applets, and Supervisor Applet.

Consumer page repository 146 stores the web pages and Applets for consumers. Consumer Applets can be selectively embedded into consumer web pages. Exemplary consumer Applets include: (consumer) Master Applet, DTS Applets, SessionID Applet, etc.

Administration page repository 149 stores the web pages and Applets for call center administration users, including: administrator, supervisor, agent, etc. Administration Applets can be selectively embedded into administration web pages. Exemplary administration Applets include: (administration) Master Applet, Agent Applet, Supervisor Applet, etc.

To better describe the present invention, the Applets stored in (or downloaded from) repository 146 can be referred to as consumer Applets, and the Applets stored in (or downloaded from) repository 149 can be referred to as administration Applets. HTTP server 152 contains a security application that allows consumer users to get access only to the web pages stored in consumer page repository 146, and allows administration users (such as administrator, supervisor, agent, etc.) to get access to the web pages stored in both consumer page repository 146 and administration page repository 149. Note that because an agent can access consumer applets, there is no need to have separate master applets stored in administration and consumer repositories. A single master applet could be utilized to perform both purposes.

Session table 145 is responsible for maintaining the information for all active sessions.

Class table 147 is responsible for keeping records of user classes or types assigned to different users. Listed are exemplary user types: administrator, supervisor, agent, and consumer.

Based on user classes (administrator, supervisor, agent, and consumer), WTS server 144 provides the following services:
(1) creating a session (consumer);
(2) storing data received from a session participant (supervisor, agent, and consumer);
(3) listing active sessions (administrator and supervisor);
(4) listing the information associated with active sessions (administrator, and supervisor);
(5) listing current users (administrator);
(6) joining a session (supervisor and agent);
(7) terminating a session (supervisor);

(8) monitoring a session (supervisor and agent);
(9) configuring a session parameters (administrator); and
(10) sending commands and information to a consumer Master Applet or an administration Master Applet in a participating browser (supervisor, agent, and consumer).

Database 156 is responsible for storing data collected in session table 145.

HTTP server 152 is responsible for processing the requests issued by one of the web browsers, retrieving the web pages from either consumer page repository 146 or administration page repository 149, and sending the web pages to the browsers that have generated these requests.

Database processing application 148 is responsible for writing the data collected in session table 145 into database 156.

Figure 3:
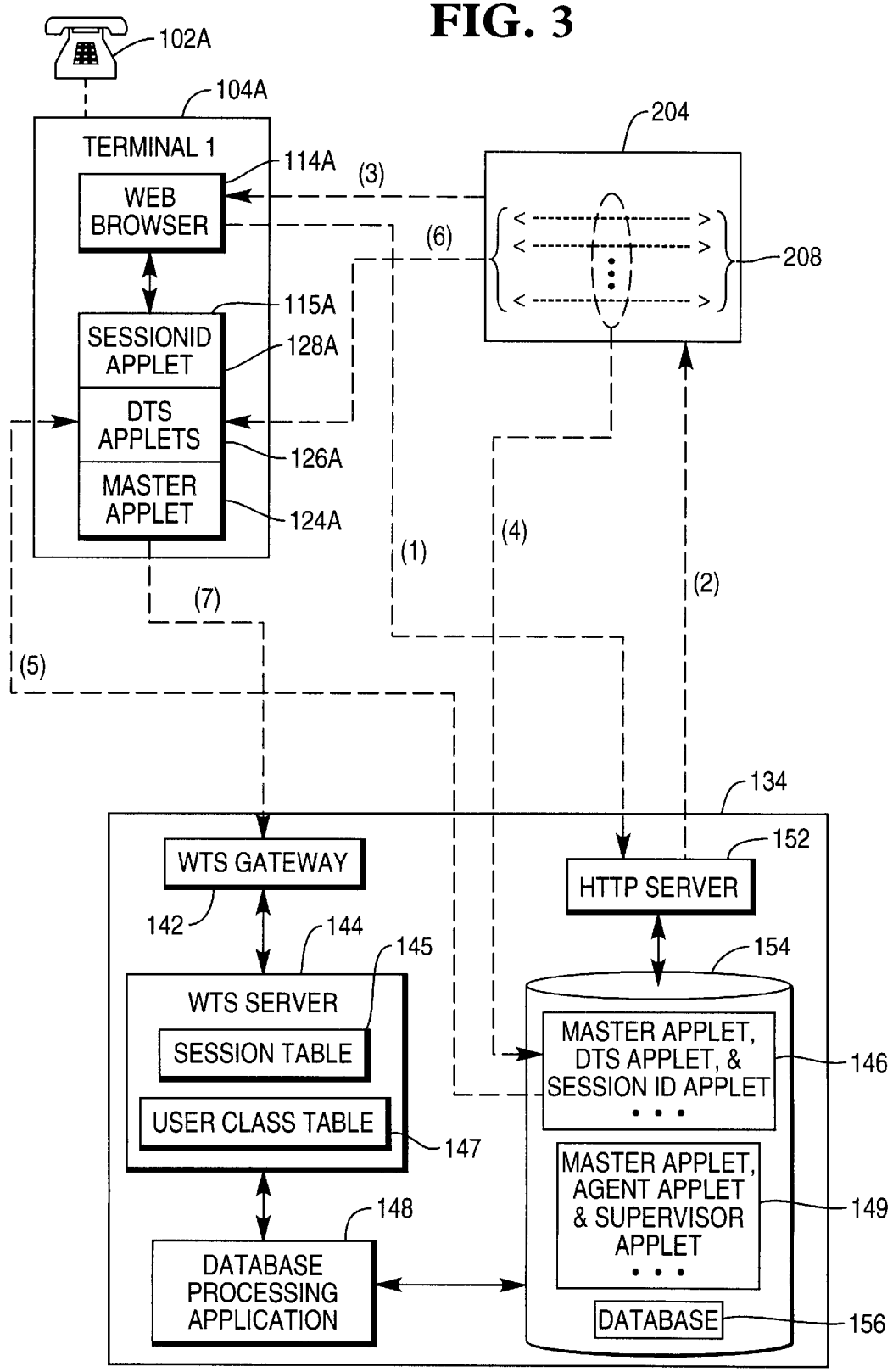
FIG. 3 shows the process of the (consumer) Master Applet, DTS Applets, and SessionID Applet being downloaded into a terminal, in accordance with the present invention.

Referring to FIG. 3, there is shown the process of how the (consumer) Master Applet, DTS Applets, and SessionID Applet being downloaded into terminal 104A from HTTP server 152 in response to loading an initial web page, and then being invoked to perform the operations in accordance with the present invention.

As shown in FIG. 3, a (consumer) Master Applet, a set of DTS Applets, and a SessionID Applet are embedded into web page 204 by using a set of applet tags 208. Web page 204 is associated with a specific URL indicating the location of web page 204 in HTTP server 152.

As indicated by dotted line (1), web browser 114A sends a request including the URL of web page 204 to HTTP server 152 via network 129 (shown in FIG. 2). As indicated by dotted line (2), in response to the request, HTTP server 152 retrieves web page 204 from consumer page repository 146 and sends it to web browser 114A via network 129. Web page 204 contains a set of applet tags 208, which indicate the location of Master Applet, DTS Applets, and SessionID Applet in HTTP server 152. As indicated by dotted line (3), web browser 114A loads web page 204. As indicated by dotted line (4), since Master Applet, DTS Applets, and SessionID Applet have not been downloaded, web browser 114A sends requests via network 129, to download these Applets based on applet tags 208. As indicated by dotted line (5), HTTP server 152 sends Master Applet, DTS Applets, and SessionID Applet to browser 114A via network 129. As indicated by dotted line (6), browser 114A stores Master Applet 124A, DTS Applets 126A, and SessionID Applet 128A into memory area 115A of terminal 104A, and initializes and invokes these Applets. After being invoked, these Applets are running together with web browser 114A, to monitor and process the activities for which they are assigned to be responsible. As indicated by line (7), Master Applet 124A opens a dedicated socket and establishes a socket connection to WTS gateway 142 for browser 114A and web page 204. Via the socket connection, Master Applet 126 sends WTS server 144 a command, together with an ID unique to browser 1 14A. In response to the command from Master Applet 126, WTS server 144 creates a session for browser 114A based on the unique ID, and issues a time stamp (loading time) indicating the time at which the command was received, and stores the URL and time stamp of web page 204 into the session created for browser 114. As will be seen in the description in connection with FIG. 6 following, the URL, command, and loading time are stored in a URL history list and a command list created for the session.

Figure 4:
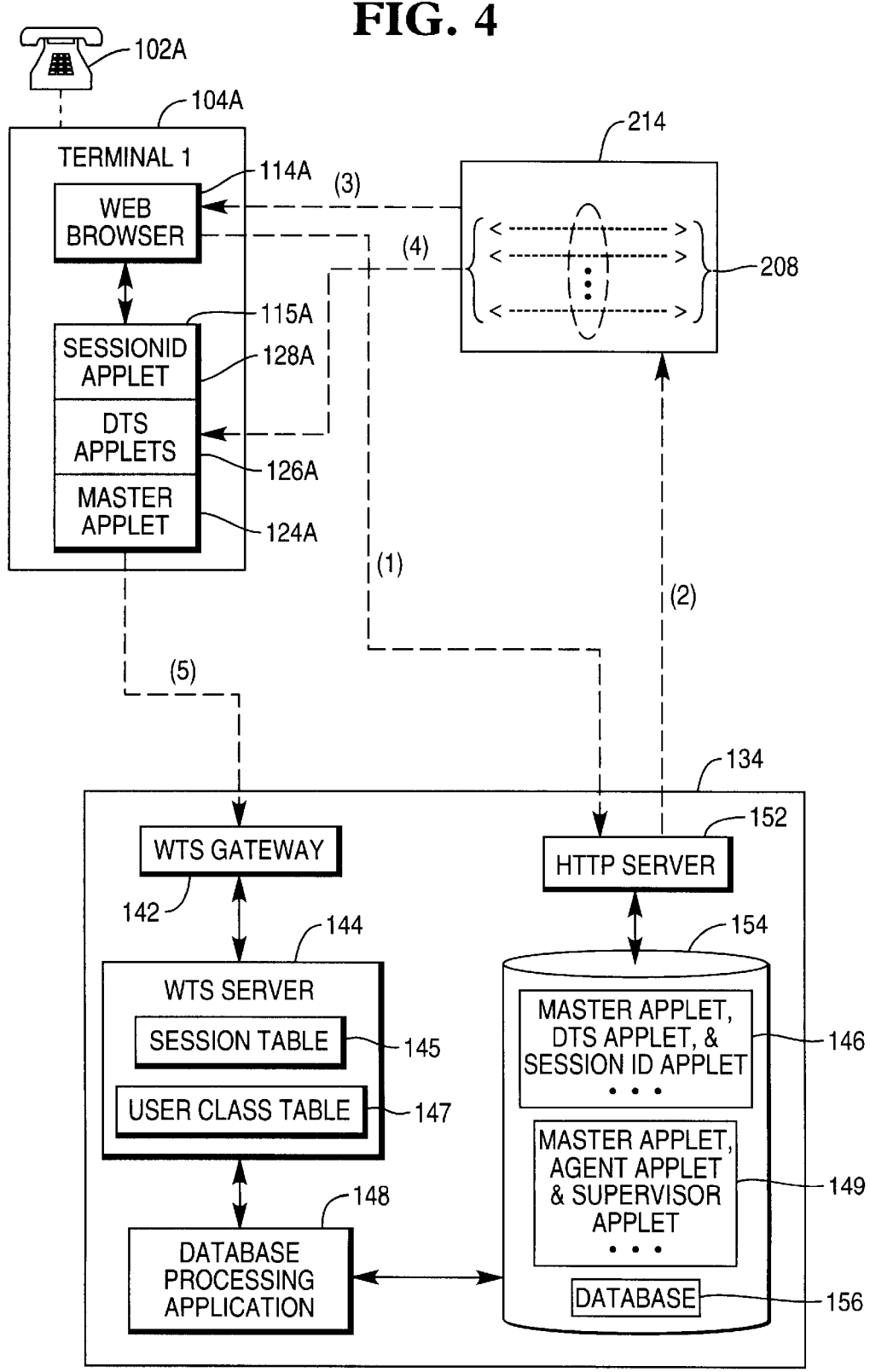
FIG. 4 shows the process of the (consumer) Master Applet, DTS Applets, and SessionID Applet being invoked, in response to loading a subsequent web page, to perform the operations in accordance with the present invention, when these Applets have been previously downloaded and cached in a terminal.

Referring to FIG. 4, there is shown the process of the (consumer) Master Applet 124A, DTS Applets 126A, and SessionID Applet 128A being invoked, in response to loading a subsequent web page 214 (subsequent to web page 204), to perform the operations in accordance with the present invention, when these Applets have been previously downloaded and cached in terminal 104A.

Figure 6:
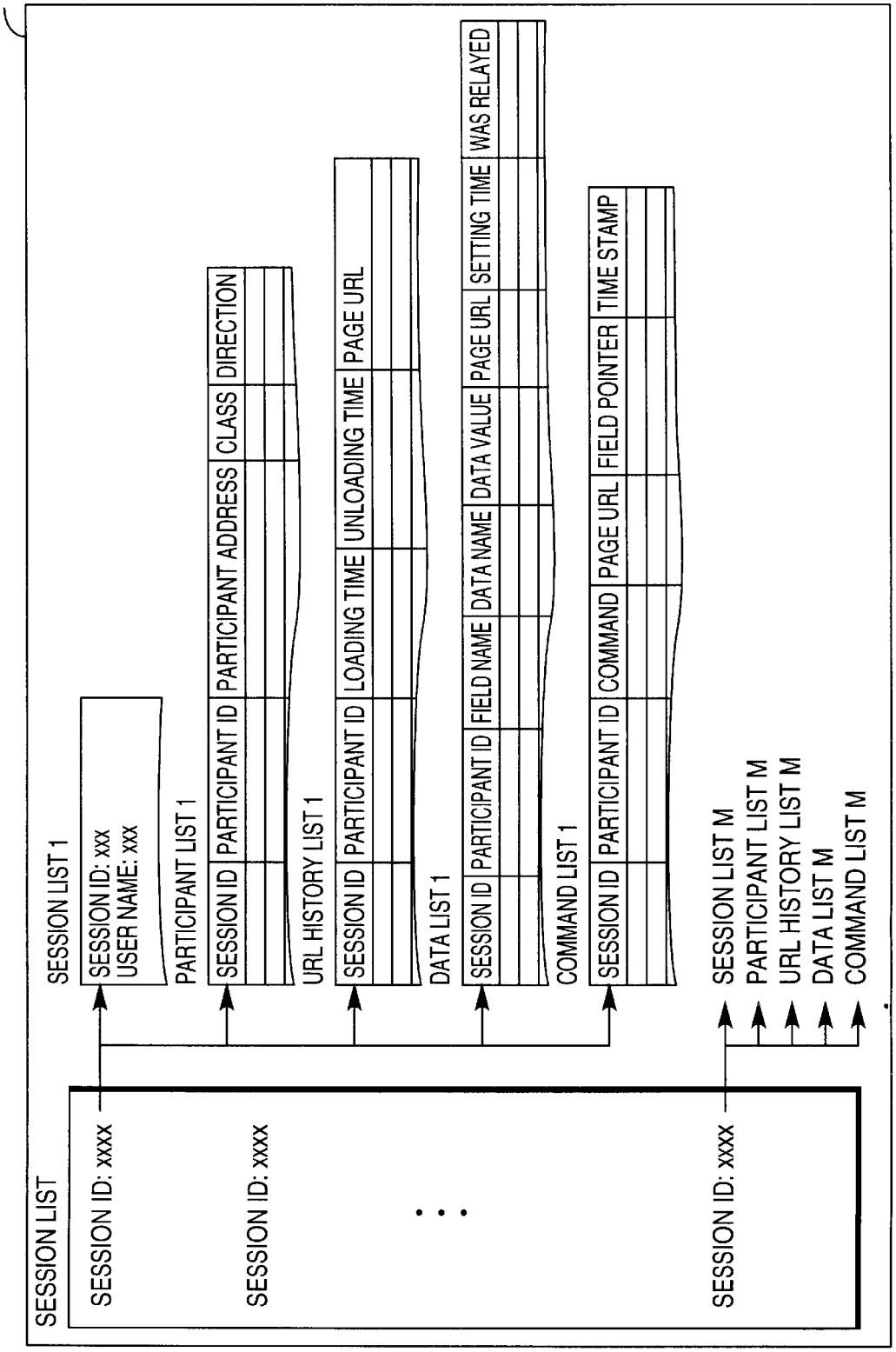
FIG. 6 shows a session table in greater detail, in accordance with the present invention.

As indicated by dotted line (1), to download web page 214, web browser 114A sends a request including the URL of web page 214 to HTTP server 152 via network 129. Before loading web page 214, the following events occur: (a) browser 114A instructs Master Applet 124A to run a stop routine, (b) via the socket connection established for browser 114A and web page 204, Master Applet 124 sends a command to inform WTS server 144 that web page 204 has been unloaded, and disconnects the socket connection established for browser 114A and web page 204, (c) WTS server 144 issues a time stamp (unloading time) indicating the time the command was received, and (d) records the URL and the time stamp of web page 204 into the session created for browser 114A. As shown in FIG. 6 and described in greater detail below, the URL, command, and unloading time are stored in a URL history list and a command list created for the session. As indicated by dotted line (2), HTTP server 152 retrieves web page 214 from consumer page repository 146 and sends it to browser 114A. Like web page 204, web page 214 contains a set of applet tags 208 for indicating the location of Master Applet 124A, DTS Applets 126A, and SessionID Applet 128A. As indicated by dotted line (3), web browser 114A loads web page 214. As indicated by dotted line (4), in response to the loading of web page 214, web browser 114A locates Master Applet 124A, DTS Applets 126A, and SessionID Applet 128A (based on the indication of applet tags 208) that are cached by browser 114A in memory area 115A, and loads these Applets and then invokes them. As indicated by line (5), Master Applet 124A opens a dedicated socket and establishes a socket connection to WTS gateway 142 for browser 114A and web page 214. Via the socket connection established for browser 114A and web page 214, Master Applet 126A sends a command, together with the ID unique to browser 114A and the URL of web page 214, to inform WTS server 144 that web page 214 has been loaded. WTS server 144 issues a time stamp (loading time) indicating the time the command was received and stores the URL and time stamp of web page into the session created for browser 114A. shown in FIG. 6 and described in greater detail below, the URL, command, and loading time are stored in a URL history list and a command list created for the session.

Figure 5:
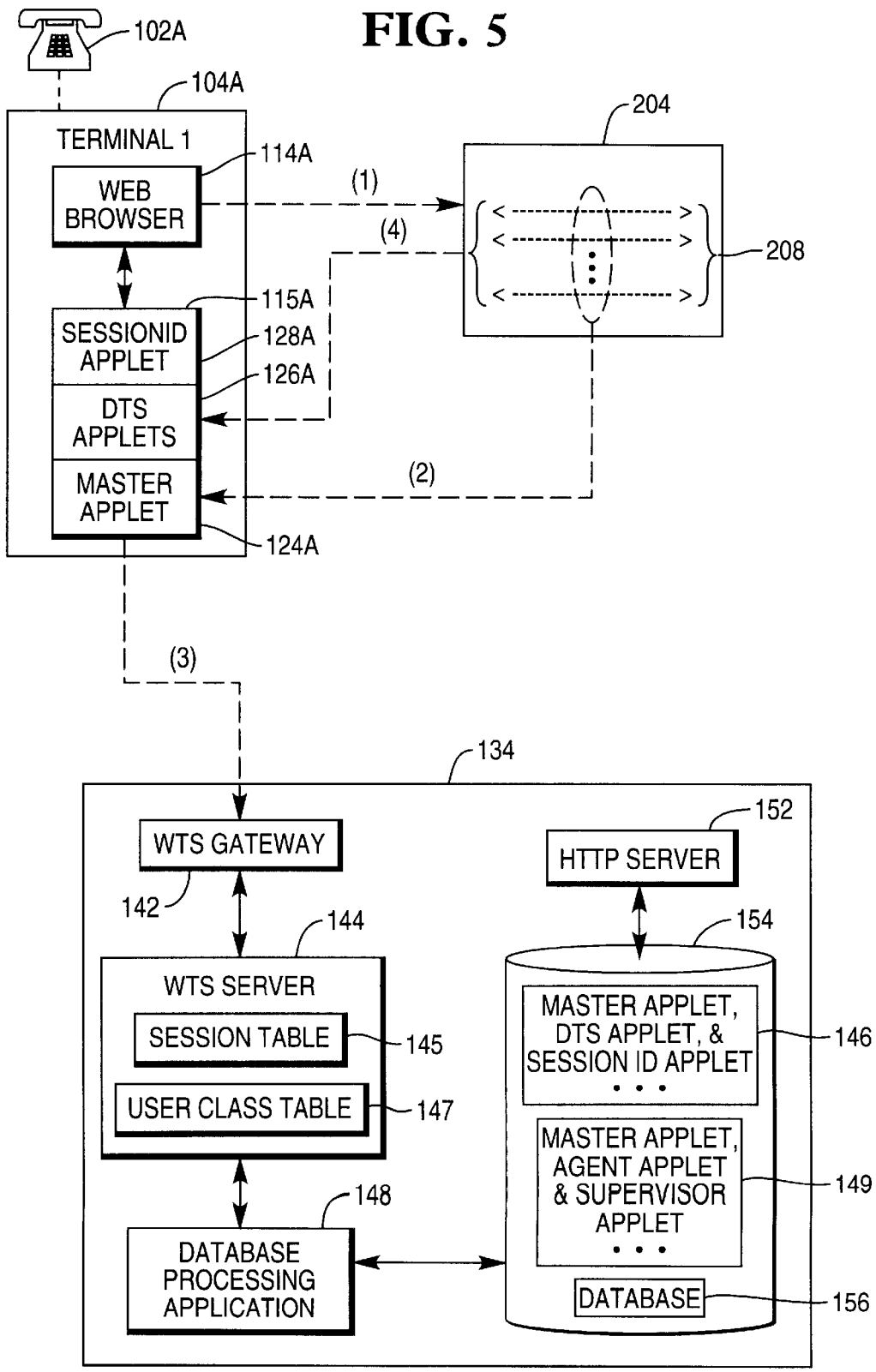
FIG. 5 shows the process of the (consumer) Master Applet, DTS Applets, and SessionID Applet being invoked, in response to loading a subsequent web page, to perform the operations in accordance with the present invention, when both these Applets and the web page have been previously downloaded and cached in a terminal.

Referring to FIG. 5, there is shown the process of the (consumer) Master Applet 124A, DTS Applets 126A, and SessionID Applet 128A being invoked, in response to loading web page 204, to perform the operations in accordance with the present invention, when both these Applets and web page 204 have been previously downloaded and cached by browser 114A in terminal 104A.

As indicated by dotted line (1), web browser 114A loads web page 204 cached in memory area 115A maintained by browser 114A. As described earlier, web page 224 contains a set of applet tags 208 indicating the location of Master Applet 124A, DTS Applets 126A, and SessionID Applet 128A. Before loading web page 224, the following events occur: (a) browser 114A instructs Master Applet 124A to run a stop routine, (b) Master Applet 124A sends a command via the socket connection established for browser 114A and web page 214A to inform WTS server 144 that web page 214 has been unloaded, and disconnects the socket connection established for browser 114A and web page 214, (c) WTS server 144 issues a time stamp (unloading time) indicating the time the command was received, and (d) WTS server 144 records the URL and time stamp of web page 214 into the session created for browser 114A. As will be seen in the description in connection with FIG. 6, the URL, command, and unloading time are stored in a URL history list and a command list created for the session. As indicated by dotted line (2), browser 114A in response to the loading of web page 224, locates Master Applet 124A, DTS Applets 126A, SessionID Applet 128A that have been cached by browser 114A in memory area 115A in terminal 104A, and initializes and invokes these Applets. As indicated by line (3), Master Applet 124A opens a dedicated socket and establishes a socket connection to WTS gateway 142 for browser 114A and web page 224. Via the socket connection established for browser 114A and web page 224, Master Applet 126A sends a command, together with the ID unique to browser 114A and the URL of web page 224, to inform WTS server 144 that web page 224 has been loaded. WTS server 144 issues a time stamp (loading time) indicating the time the command was received and stores the URL and time stamp into the session created for browser 114. As will be seen in the description in connection with FIG. 6, the URL, command, and loading time are stored in a URL history list and a command list created for the session.

In the example shown in FIG. 5, it should be appreciated that even through no request arrives at HTTP server 144 when web page 204 is loaded from cached memory in terminal 104A, Master Applet 124A still sends browsing activities to WTS server 144.

It should be noted that the processes shown in FIGS. 3–5 of loading and invoking Master Applet, DTS Applets, and SessionID Applet for terminal 104A can also be used for terminals 104B through 104N.

In FIGS. 3–5, Master Applet, DTS Applets, and SessionID Applet are all embedded into web pages 204 and 214. However, it should be noted that there is no requirement that all of these Applets be embedded into a web page. Depending on the desired functions to be performed, respective Applets can be selectively embedded into a web page by selectively setting applet tags in the web page. For example, if data synchronization and tracking of individual elements are not needed, the applet tags for linking DTS Applets can be eliminated from the web page. By the same token, if additional functions are needed, additional applet tags can be added into the web page to link additional Applets.

Referring to FIG. 6, there is shown session table 145 (see FIG. 1) in greater detail, in accordance with the present invention.

While browsers at their respective terminals are browsing through the web pages in web site 134, WTS server 144 collects and analyzes the information about the interactions between all browsers and the web pages that have been downloaded to the browsers from web site 134. One difficulty in collecting and analyzing such information is that browsing individual web pages in web site 134 is a stateless process. More specifically, web site 134 receives a sequence of requests from different browsers, and sends the respective web pages to the respective browsers in response to the sequence requests. Since in processing the requests from an individual browser, web site 134 does maintain a constant connection to the same browser to keep an one-to-one relationship, web site 134 has no control over, and does not maintain data on, the sequences of the requests from the browsers.

To meaningfully collect and analyze the information about the interactions between the browsers and web pages, a session is defined as a collection of web page interactions that occur over a given period of time from a specific browser. A session is created when a browser first hits web site 134, and a session window (or session length interval) is defined for the session. If activities from a specific browser (identified by an ID unique to the browser, issued by a respective Master Applet) does not occur within the session window, the session is terminated and cleaned up by WTS server 144. A session window is refreshed (reset to time zero) each time the information about the associated browser is sent to WTS server 144. For example, if a session window is defined as 15 minutes, as long as the associated terminal has some activity every 15 minutes, the session will remain open. After 15 minutes of inactivity, the session is terminated. A subsequent request from the same terminal will cause a new session to be created. After a session has been created for a terminal, one or more other terminals can join the session.

As shown in FIG. 6, session table 145 includes M Session IDs created for M sessions respectively. Each of the session ID is associated with: (1) a session list for maintaining information about a session, (2) a participant list for maintaining information about all participant browsers in a session (note: when a session is first created, it only contains one participant), (3) a URL history list for maintaining information about all web pages visited by all participants in a session, (4) a data list for maintaining information about the data fields on the web pages visited by all participants in a session, and (5) a command list for maintaining information about all commands issued to WTS server 144 by the various participants in a session.

Typical items in a session list are: (1) SessionID for identifying a session, (2) UserName for indicating the actual name for whom the session is created, (3) StartTime for indicating the time of starting the session, (4) StopTime for indicating the time of stopping the session, and (5) SessionNotes for recording the notes of the session.

Typical fields contained in a participant list are: (1) SessionID for linking the participant list to a session, (2) ParticipantID for identifying a participant, (3) ParticipantAddresses for indicating a participant's IP address, (4) Class for indicating the user class of the participant (customer, agent, supervisor, administrator, etc.) and (5) Direction for indicating the synchronization direction for the participant browser.

Typical fields contained in a URL history list are: (1) SessionID for linking the URL history list to a session, (2) ParticipantID for identifying a participant who visited the web page, (3) LoadingTime for indicating the loading time of the web page, and (4) UnloadingTime for indicating the unloading time of the web page, and (5) PageURL for indicating the URL of a web page visited.

Typical fields contained in a data list are: (1) SessionID for linking the data list to a session, (2) ParticipantID for indicating the participant browser who updated this data field, (3) FieldName for indicating the actual name of the data field, (4) DataName for indicating the name of the data field displayed on a web page, (5) DataValue for indicating the value of the data field, (5) Page URL for indicating the web page on which the data field was displayed, (6) TimeStamp for indicating the time at which this data field is updated, and (7) WasRelayed for indicating if this data field has been broadcasted.

Typical fields contained in a command list are: (1) SessionID for linking the data list to a session, (2) ParticipantID for indicating the participant browser issuing the command, (3) Command for indicating the specific command executed (loading a page, unloading a page, changing a data field, etc.), (4) Page URL for indicating the web page to which the command operated, (5) FieldPoint for indicating the data field to which the command operated, and (6) TimeStamp for indicating the time at which command was executed.

Before a session is purged from session table 145, database processing application 147 stores the associated session list, URL history list, and command list to database 156. The data contained in these three lists can be used by data warehouse integration applications.

Figure 7:
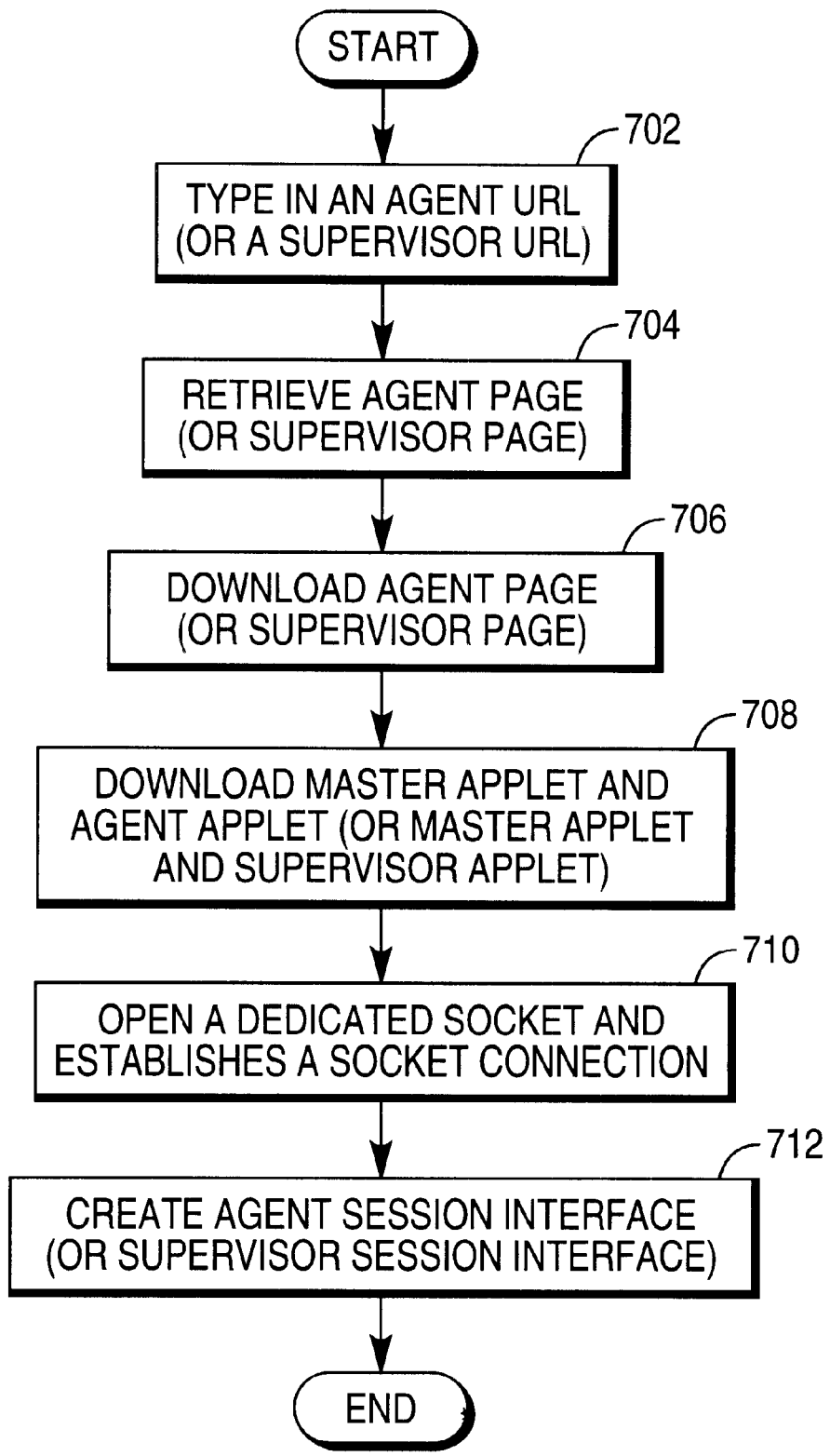
FIG. 7 shows how an agent (or supervisor) can create a session interface by downloading an agent page (or a supervisor page) from administration page repository 149, in accordance with the present invention.

Referring to FIG. 7, there is shown an operation for creating a session interface for an agent (or a supervisor) by downloading an agent page (or a supervisor page) from administration page repository 149, in accordance with the present invention. In the example shown in FIG. 7, it is assumed that administration user class (either agent user class or supervisor user class) is assigned to terminal 104N, so that the security application in HTTP server 152 grants the access to the web page stored in both consumer page repository 146 and administration page repository 149.

At step 702, an agent at terminal 144N types in an agent URL at terminal 104N, and browser 114N sends the URL to HTTP server 152, to retrieve an agent page, in which an (administration) Master Applet and an Agent Applet are embedded. For a supervisor, he/she types in a supervisor URL at terminal 104N, and browser 114N sends the URL to HTTP server 152, to retrieve a supervisor page, in which an (administration) Master Applet and a Supervisor Applet are embedded.

At step 704, HTTP server 152 retrieves the agent page (or a supervisor page) from administration page repository 149 and sends it to browser 114N.

At step 706, browser 114N downloads the agent page, in which a Master Applet (administration Master Applet) and an Agent Applet are embedded; or downloads the supervisor page, in which a Master Applet (administration Master Applet) and a Supervisor Applet are embedded.

At step 708, browser 114N downloads the Master Applet and Agent Applet from HTTP server 152, initializes and invokes these Applets; or downloads the Master Applet and Supervisor Applet from HTTP server 152, initializes and invokes these Applets.

At step 710, Master Applet opens a dedicated socket, establishes a socket connection to WTS gateway 142, and sends an unique ID to WTS server 144. WTS server 144 is able to identify browser 114N based on the unique ID.

Figure 8A:
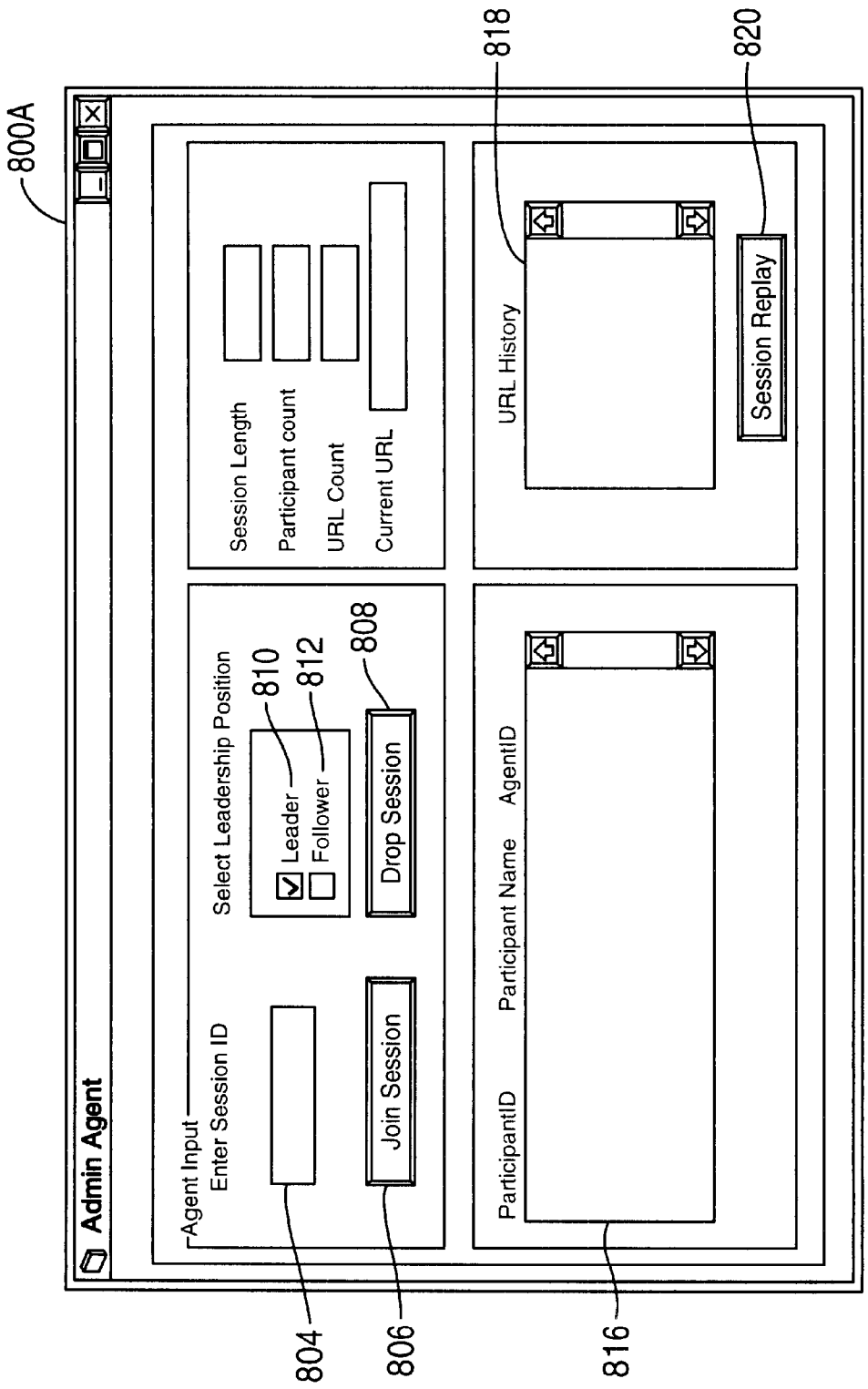
FIG. 8A shows an agent session interface, in accordance with the present invention.
Figure 8B:
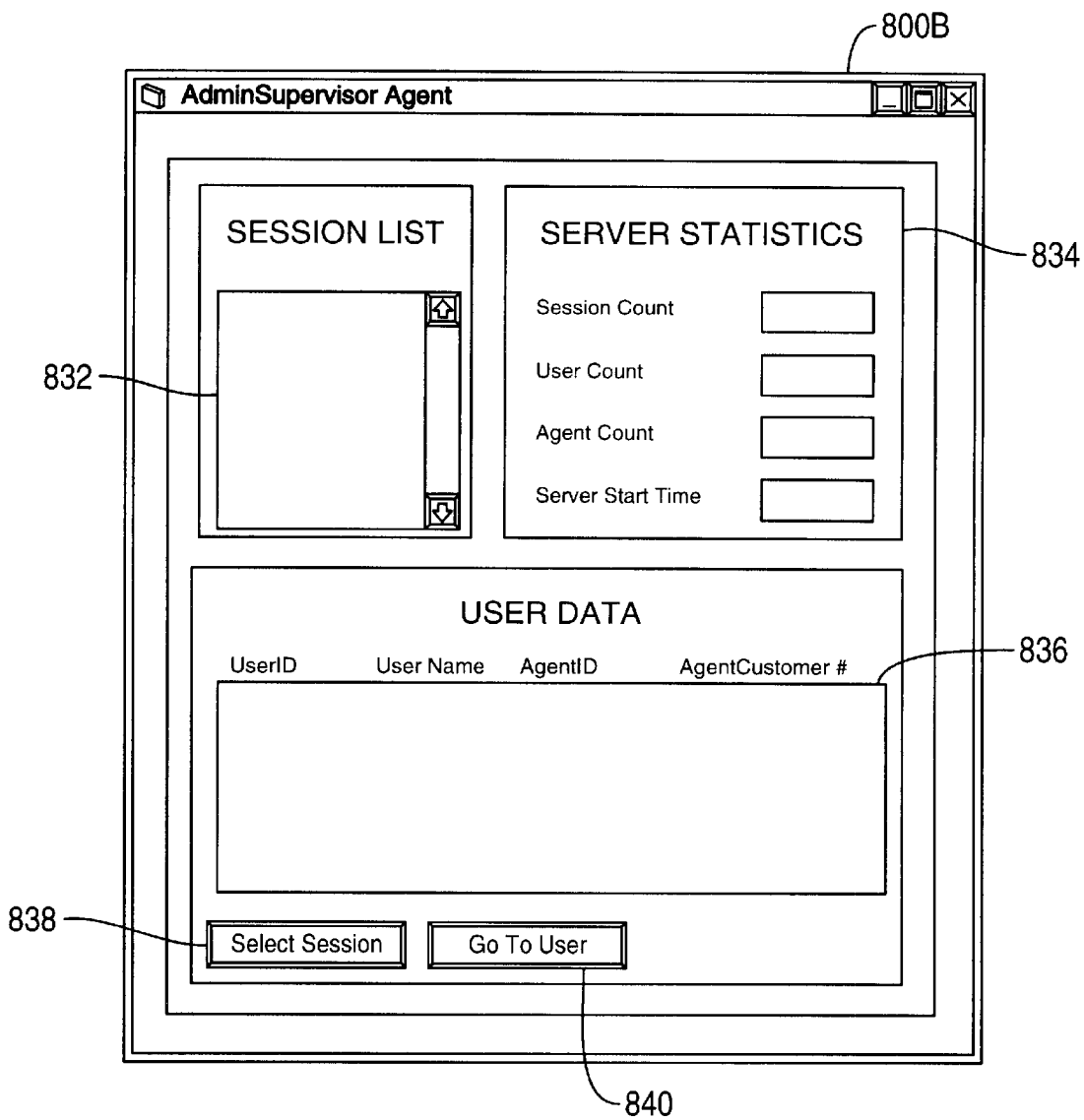
FIG. 8B shows a browser supervisor session interface, in accordance with the current invention.

At step 712, Agent Applet creates an agent session interface 800A shown in FIG. 8A for the agent user; or Supervisor Applet creates a supervisor session interface 800B shown in FIG. 8B for the supervisor agent.

Referring to FIG. 8A, there is shown an agent session interface 800A created for an agent at step 712, in accordance with the present invention.

As shown in FIG. 8A, the session interface contains a text box 804 for entering a session ID, a Join session button 806 for joining a session identified by the session ID, a drop button 808 for leaving a session, a leader check box 810 (selecting of which designates a browser as a leading browser in synchronization), a follower check box 812 (selecting of which designates a browser as a following browser in synchronization), a scrollable list box 816 for displaying the information contained in the participant list associated with a selected session, a scrollable list box 818 for displaying the information in an identified URL history list, and a Display URL Button 820 for displaying URLS selected in URL History list 818. If both the leader and follower check boxes 810 and 812 are selected in the agent session interface, browser 114A acts as both leading and following browser in synchronization.

Referring to FIG. 8B, there is shown a browser supervisor session interface 800B created for a supervisor at step 712, in accordance with the current invention.

As shown in FIG. 8B, the session interface contains a scrollable list box 832 for displaying session IDs of all active sessions in session table 145 and for selecting one of the session IDs, a text box 834 for displaying relevant statistics of WTS server 144, a multi column scrollable list box 836 for displaying details about the session selected in scrollable list box 832, a select session button 838 for selecting a session from scrollable list box 832. By using the information in scrollable list box 832, a supervisor agent can monitor all active sessions. By using the information in multi column scrollable list box 836, a supervisor can monitor operational status of a session selected from scrollable list box 832, including: (1) whether this session is being helped by an agent, (2) user name, and (3) agent ID. By selecting select session button 838, a supervisor can access an agent session interface as shown in FIG. 8C.

Figure 8C:
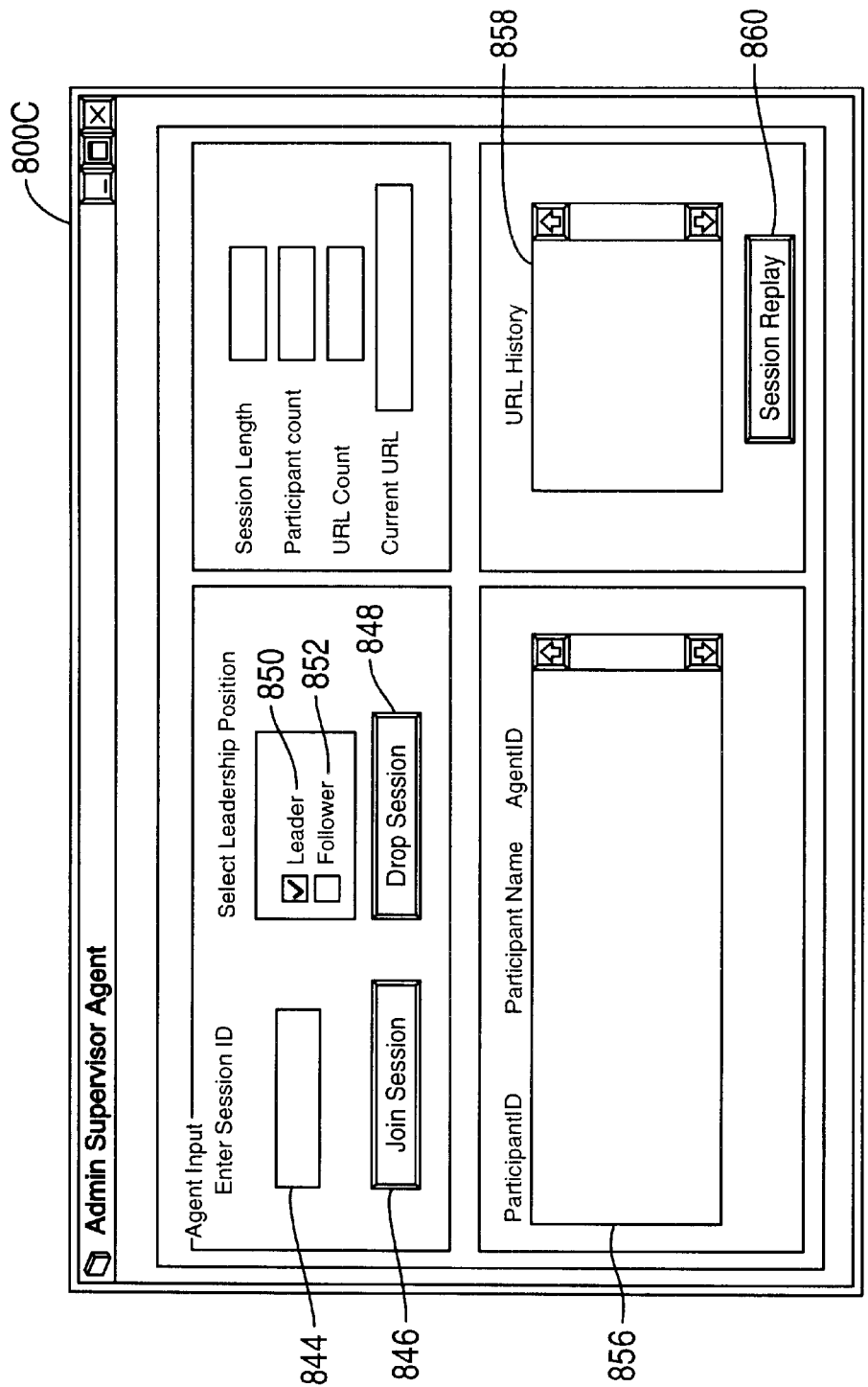
FIG. 8C shows a supervisor agent session interface, in accordance with the present invention.

Referring to FIG. 8C, there is shown a supervisor agent session interface 800C, in accordance with the present invention.

Figure 9:
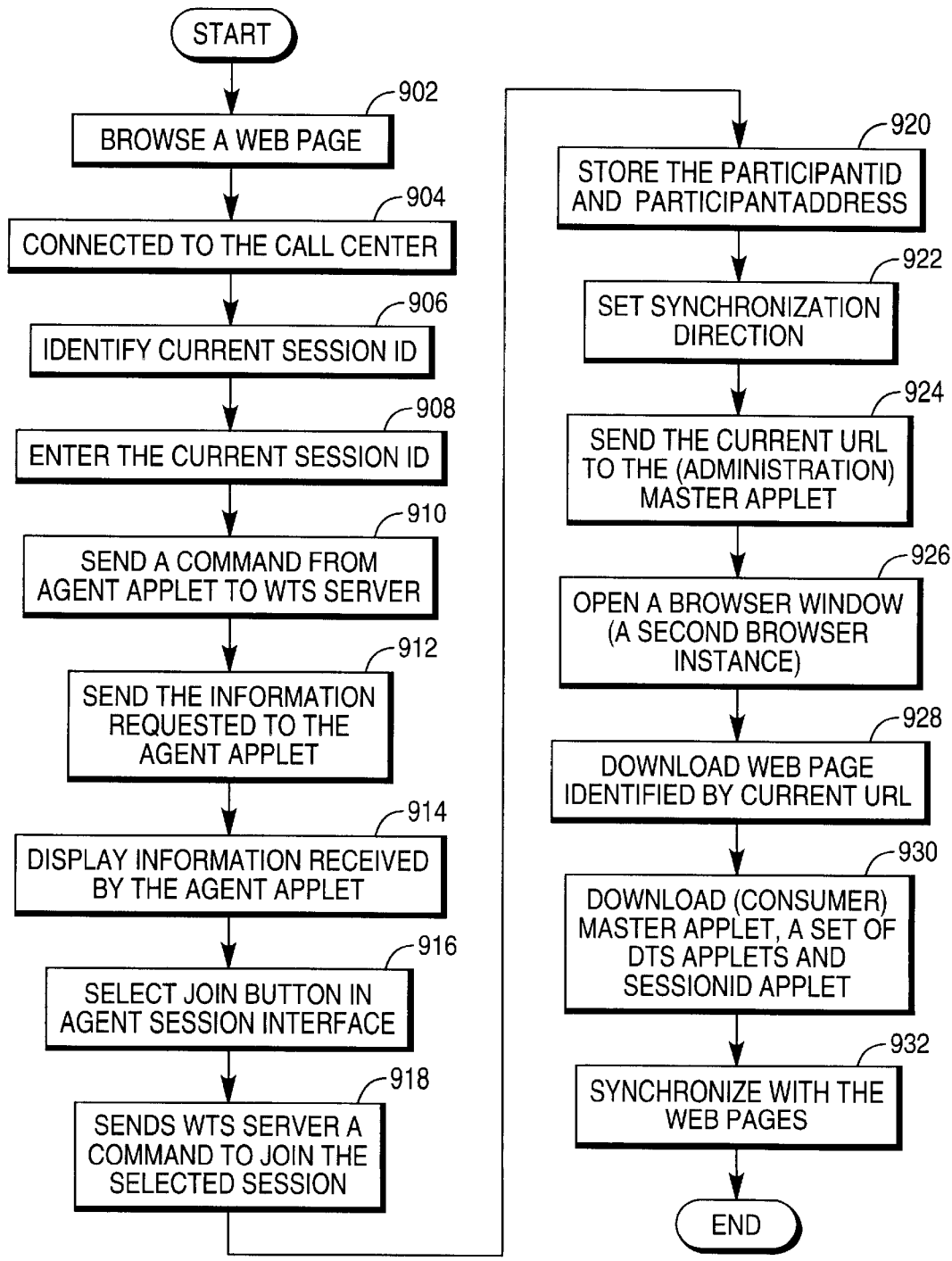
FIG. 9 shows a flowchart illustrating the operation of joining a session by an agent, in accordance with the present invention.

Referring to FIG. 9, there is shown a flowchart illustrating the operation of joining a session by an agent, in accordance with the present invention.

In the example shown in FIG. 9, it is assumed that: (1) a consumer at terminal 104A is browsing web pages from consumer page repository 146 via browser 114A, (2) session list 1 shown in FIG. 6 has been created for browser 114A, (3) an agent class has been assigned to browser 114N, (4) agent session interface 800A shown in FIG. 8A has been displayed on terminal 104N; (5) a (administration) Master Applet and Agent Applet have been previously downloaded into browser 114N, (6) a dedicated socket connection has been established for session interface 800A displayed at terminal 104N by the (administration) Master Applet, and (7) the agent at terminal 104A is on duty at a call center.

As shown in FIG. 9, at step 902, the consumer is browsing a web page at terminal 104A. On the web page, SessionID Applet 128A displays the current session ID. A call center telephone number the consumer can call is also displayed on the web page.

At step 904, the consumer is connected to the call center by dialing the telephone number via telephone 102A (see FIG. 1), and the call is directed by the call center to the agent.

At step 906, the consumer tells, via telephone 102A (see FIG. 1), the agent the current session ID displayed. It should be noted that, instead of using the telephone, the agent can be informed of the current session ID by alternative methods. For example, the consumer can enter his/her telephone number into a special web page that contains a customer ID identifying the consumer along with the current session ID. This information can be stored into a special lookup table that can be used by the agent to identify the customer. At step 908, at terminal 104N, the agent types the current session ID into text box 804 (see FIG. 8A).

At step 910, in response to a loss of focus or a pressing of the Enter key, the (administration) Master Applet at terminal 104N sends a command to WTS server 144, to retrieve the information in participant list 1, URL history list 1, and data list 1 (see FIG. 6) for the Agent Applet.

At step 912, WTS server 144 sends the information requested to the Agent Applet (via the Master Applet).

At step 914, the Agent Applet at terminal 104N displays some information from participant list 1 and URL history list 1 in (participant) scrollable list box 816 and (URL history) scrollable list box 818, respectively.

At step 916, the agent selects join button 806 in agent session interface 800A displayed on terminal 104N.

At step 918, in response to the selection at step 916, through the socket connection which has been established for agent session interface displayed on terminal 104N, the (administration) Master Applet sends WTS server 144 a command to join the selected session. Based on the identification associated with the socket connection, WTS server is able to generate a ParticipantID for browser 114N and to find the ParticipantAddress for terminal 104N.

At step 920, WTS server 144 stores the ParticipantID and ParticipantAddress into participant list 1. At this step, participant list 1 includes two participant records (two rows) containing the PaticipantIDs for browsers 114A and 114N respectively.

At step 922, at terminal 104N, the agent selects: leading check box 810 or following check box 812, or both of them. By only selecting leader check box 810, the activities at terminal 104N are synchronized at terminal 104A, but not other way around. By only selecting follower check box 812, the activities at terminal 104A are synchronized at terminal 104N, but not other way around. By selecting both leader and follower check boxes 810 and 812, the activities at terminals 104A and 104N are synchronized with each other (bi-directional synchronization). In response to the selection(s), through the socket connection which has been established for agent session interface 800A, the (administration) Master Applet sends WTS server 144 a command designating the synchronization direction. WTS server 144 stores the synchronization direction information into the Direction fields of the two records in participation list 1. In this example, it is assumed that the bi-directional synchronization has been selected for terminals 104A and 104N.

At step 924, WTS server 144 sends the (administration) Master Applet the URL of the web page being currently browsed at terminal 104A.

Figure 10:
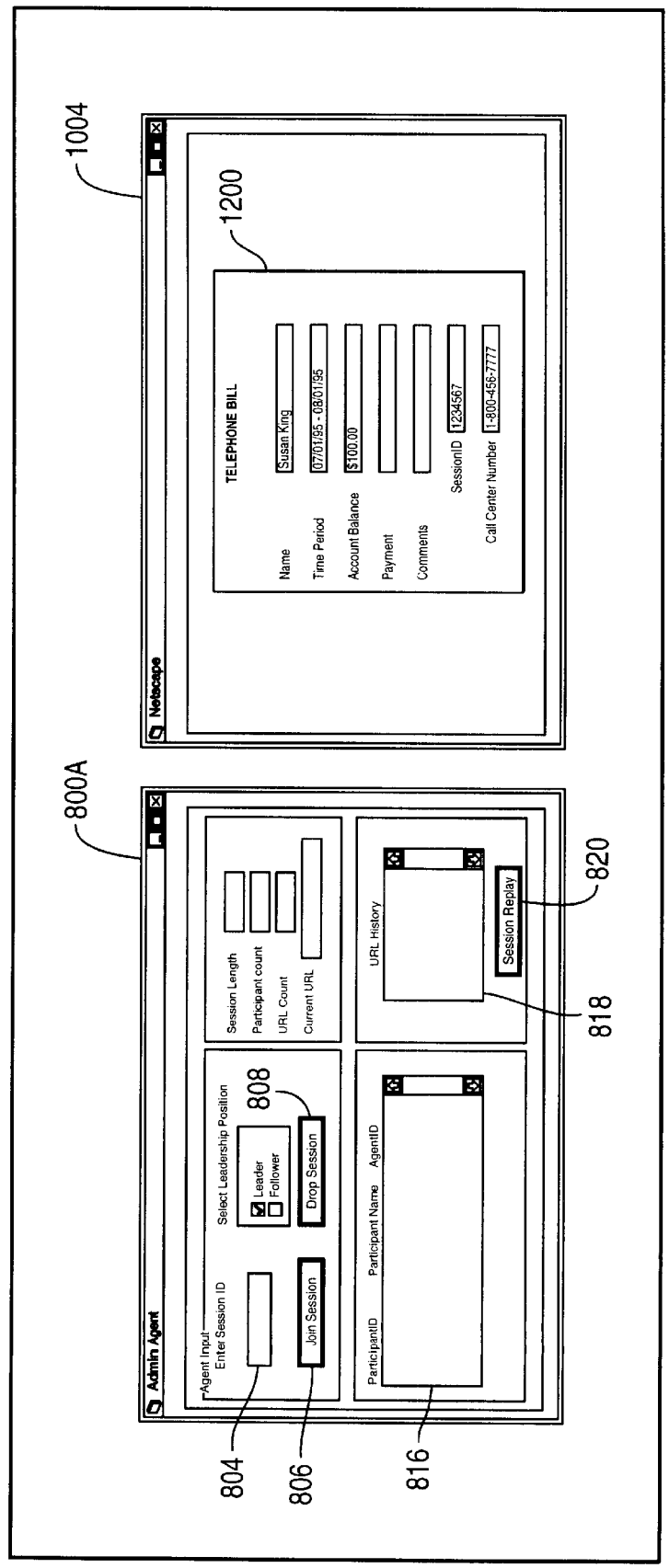
FIG. 10 shows a screen display containing two browse instances, in accordance with the present invention.

At step 926, the Agent Applet at terminal 104N opens a browser window 1004 (a second browser instance) as shown in FIG. 10.

At step 928, browser 114N downloads the web page identified by the URL from consumer page repository 146, and displays it in browser window 1004. A (consumer) Master Applet, a set of DTS Applets, and a SessionID Applet are embedded in the web page downloaded.

At step 930, browser 114N downloads (consumer) Master Applet 124N, set of DTS Applets 126N, and SessionID Applet 128N.

At step 932, the web pages displayed in second browser window 1004 at terminal 104N are being synchronized with the web pages being displayed at terminal 104A.

After step 932, if the agent (the first agent) at terminal 104A needs assistance from another agent (the second agent) at terminal 104K, the first agent can call the second agent and tell him/her the current session ID. The second agent can then join the current session using an agent session interface as shown in FIG. 8A displayed at terminal 104K.

Referring to FIG. 10, there is shown a screen display containing two browser instances (800A and 1004) at terminal 104N, in accordance with the present invention.

As shown in FIG. 10, at terminal 104N, the first browser instance provides an agent session interface 800A to control and monitor the current session, and the (administration) Master Applet for agent session interface 800A establishes and maintains a socket connection for agent session interface 800A. The second browser instance provides a browser window 1004 to display the web pages being synchronized. (Consumer) Master Applet 124N establishes and maintains a socket connection for each web page displayed in browser window 1004.

Referring to FIG. 11, there is shown a flowchart illustrating the operation of web page synchronization, in accordance with the present invention.

In the example shown in FIG. 11, it is assumed that: (1) a consumer at terminal 104A is browsing web pages from consumer page repository 146 via browser 114A, (2) a session has been created for browser 114A, (3) session list 1 and participant list 1 shown in FIG. 6 have been created for the session, (4) bi-directional synchronization has been selected for terminal 104A and all participant terminals, and (5) the (consumer) Master Applet, DTS Applets, and SessionID Applet have been downloaded into browser 104A and all participant browsers.

As shown in FIG. 11, at step 1104, browser 114A loads a web page either from consumer page repository 146 or from memory area 115A in terminal 104A. If Master Applet 124A, DTS Applets 126A, and SessionID Applet 128A had not been download to browser 114A, browser 114A would download these Applets from consumer page repository 146. However, in this example, these Applets are assumed to be downloaded.

At step 1106, in response to the loading of the web page, browser 114A initializes and invokes Master Applet 124A, DTS Applets 126A, and SessionID Applet 128A.

At step 1108, Master Applet 124A: (1) opens a dedicated socket, and establishes a socket connection to WTS gateway 142 for browser 114A and the web page loaded, and (2) via the socket connection, sends WTS server 144 a command together with an ID unique to browser 114A and the URL of the web page loaded. Based on the unique ID, WTS server is able to identify the session created for browser 114A.

At step 1110, WTS server 144 identifies the session for browser 114A.

At step 1112, WTS server 144 locates all IP addresses assigned to participant terminals in participant list 1 (shown in FIG. 6), and sends a command, together with the URL, to all the participant terminals (except that WTS server 144 does not sent the URL to terminal 104A, because the URL is originated from terminal 104A).

At step 1114, upon receiving the command, the (consumer) Master Applets in the participant terminals initialize themselves and pass the URL to their respective browsers.

At step 1116, the respective browsers in the participant terminals download and display the web page according to the URL.

It should be noted that, like terminal 104A, each of the participant terminals (at which agent session interface is displayed) can lead the page synchronization using the operation shown in FIG. 11.

Referring to FIG. 12A, there is shown a web page 1200 containing five data fields, specifically: name 1202, time period 1204, account balance 1206, payment 1208, comments 1210, a text box 1212 for displaying the current session ID, and a text box for displaying the call center number the consumer can call, in accordance with the present invention.

Referring to FIG. 12B, there is shown a web page that is similar to that of FIG. 12A, except that the data in the name field 202 has been changed from Susan King to Sue Grant, and a comment indicating that the name contained in field 202 has been changed is provided in comments field 1210. These changes are also displayed in a web page 1200' synchronized at a participant terminal, in accordance with the present invention.

Figure 13:
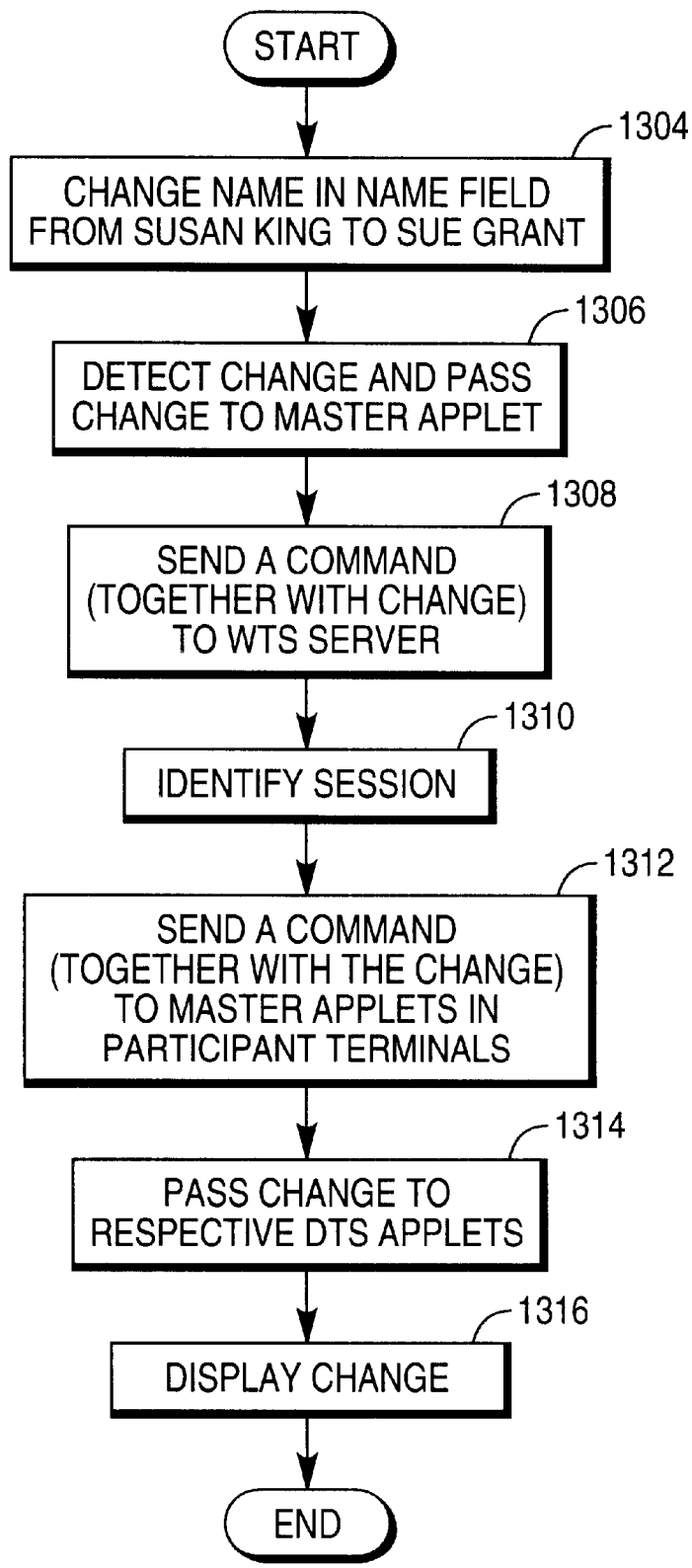
FIG. 13 shows a flowchart illustrating the operation of data synchronization, in accordance with the present invention.

Referring to FIG. 13, there is shown a flowchart illustrating the operation of data synchronization, in accordance with the present invention.

In the example shown in FIG. 13, it is assumed that: (1) a customer at terminal 104A is browsing web pages via browser 114A, (2) a session has been created for terminal 104A, (3) session list 1 and participant list 1 shown in FIG. 6 has been created for the session, (4) terminal 104N is one of the participants, (5) web page 1200 containing five data fields shown in FIG. 12A is displayed on terminals 104A and all participant terminals, (6) a bi-directional synchronization has been selected for terminal 104A and all participant terminals, (7) the (consumer) Master Applet, DTS Applets, and SessionID Applet have been downloaded to browser 114A and all participant browser, (8) the DTS Applets contains five individual Applets: DTS Applet$_1$, DTS Applet$_2$, DTS Applet$_3$, DTS Applets$_4$, and DTS Applet$_5$, (9) these five individual DTS Applets are respectively responsible for monitoring and processing the events occurred on the five data fields of web page 1200 shown in FIG. 12A, (10) (consumer) Master Applet 124A has established a dedicated socket connection to WTS gateway 142 for web page 12A displayed at terminal 104A, and (11) the customer at terminal 104A wants to make changes to name field 1202 from Susan King to Sue Grant.

As shown in FIG. 13, at step 1304, the customer changes the name in name field 1202 from Susan King to Sue Grant.

At step 1306, in response to a loss of focus on name field 1202 or pressing the Enter key, DTS Applet, detects the change and passes the change to Master Applet 124A. Note that the change of the form field value could also be detected through a proprietary interface between the master applet and the web browser.

At step 1308, via the dedicated socket connection, Master Applet 124A sends WTS server 144 a command specifying the change of name field 1202. Since this change is passed to WTS server 144 via the dedicated socket connection established for web page 1200, WTS server 144 is able to recognize the origin of the command, web page 1200, and the name field upon which the change was made.

At step 1310, WTS server 144 identifies the session created for browser 114A.

At step 1312, WTS server 144 locates the IP addresses assigned to participant browsers in participant list 1 and sends a command (together with the change of name field 1202) to the Master Applets in all other participant terminals (except that WTS server 144 does not send the command and change to browser 114A, since this change originated from browser 114A).

At step 1314, upon receiving the command, the (consumer) Master Applets (including Master Applets 124N) pass the change of name field 1200 to their respective DTS Applets, including the DTS Applet$_1$ at browser 114N.

At step 1316, the DTS Applet, display the update "Susan Grant" into the name fields on respective web page 1200 displayed on the respective terminals, including terminal 104N.

It should be noted that the operation shown in FIG. 13 can be used to perform data synchronization for the other four data fields on web page 1200 shown in FIG. 12A.

It should also be noted that the data field synchronization can also be performed at terminal 104N. For example, as shown in FIG. 12B, when the agent at terminal 104N enters comments of "Account's name had been changed" to comments field 1210' on web page 1200', this updates will be displayed in comments field 1210 at terminal 104A, by using the operation shown in FIG. 13.

Figure 14:
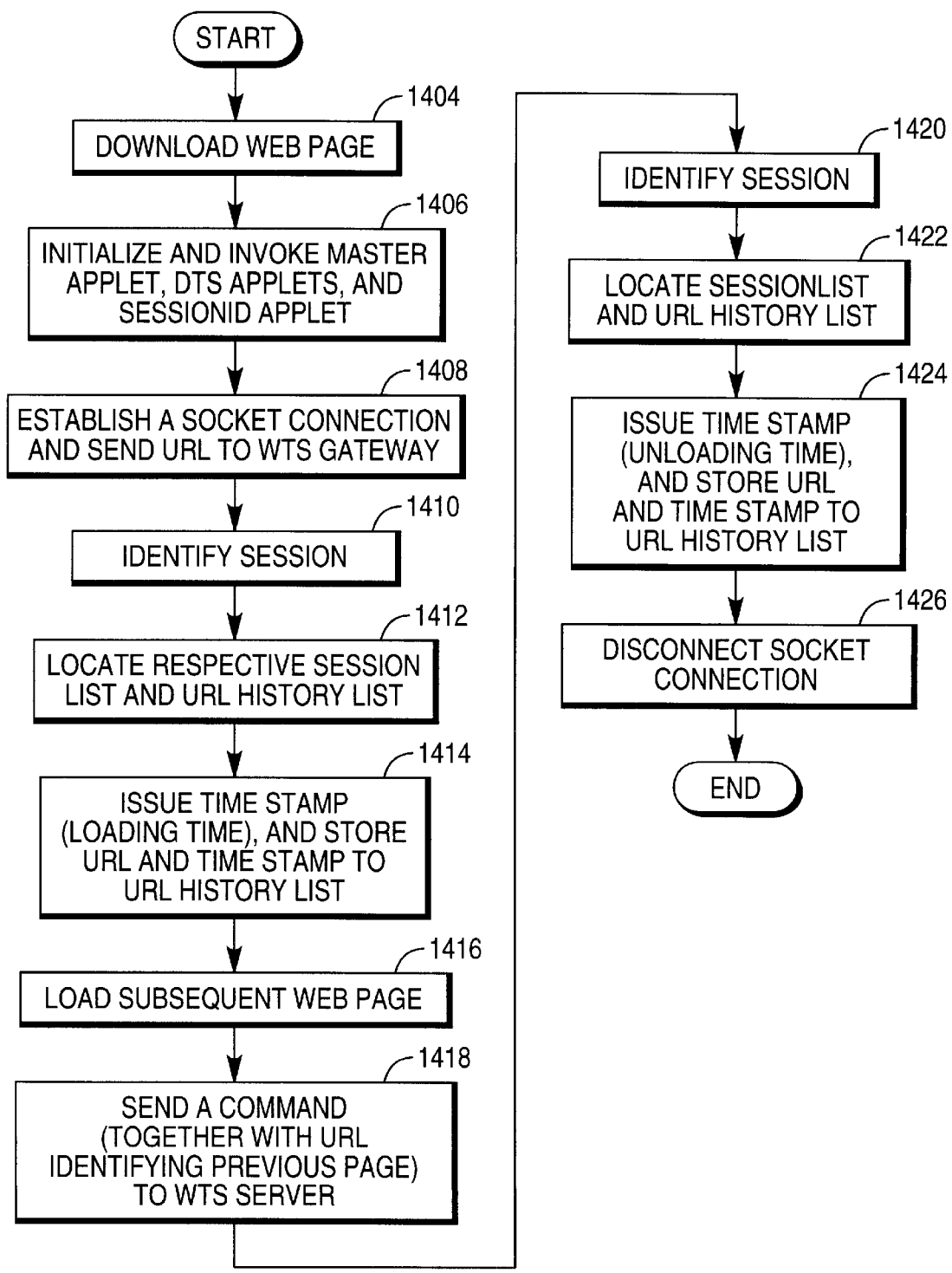
FIG. 14 shows a flowchart illustrating the operation of web page tracking, in accordance with the present invention.

Referring to FIG. 14, there is shown a flowchart illustrating the operation of web page tracking, in accordance with the present invention.

In the example shown in FIG. 14, it is assumed that: (1) a customer at terminal 104A is browsing web pages via browser 114A, (2) a session has been created for terminal 104A and all participant terminals, (3) session list 1, participant list 1, and URL history list 1 shown in FIG. 6 have been created for the session, (4) bi-directional synchronization has been selected for terminal 104A and all participant terminals, and (5) the (consumer) Master Applet, DTS Applets, and SessionID Applet have been downloaded into terminals 104A and all participant terminals.

As shown in FIG. 14, at step 1404, browser 114A downloads a web page from either the consumer page repository 146 or memory area 115A of terminal 104A. If Master Applet 124A, DTS Applets 126A, and SessionID Applet 128A had not been download to terminal 104A, browser 114A would download them from HTTP server 152. However, in this example, these Applets have been downloaded.

At step 1406, web browser 114A initializes and invokes Master Applet 124A, DTS Applets 126A, and SessionID Applet 128A.

At step 1408, Master Applet 124A opens a dedicated socket and establishes a socket connection to WTS gateway 142 for web browser 114A and the web page loaded. Master Applet 124A then sends WTS server 144 a command, together with: (1) an ID unique to browser 114A, and (2) the URL of the web page loaded. When commands and URL are delivered through this socket connection, WTS server 144 is able to recognize the origin of the commands and URL.

At step 1410, WTS server 144 identifies the session ID for browser 114A.

At step 1412, WTS server 144 locates the session list 1 and URL history list 1.

At step 1414, WTS server 144 issues a time stamp (loading time) for indicating the time at which the command was received, and stores the URL and time stamp to URL history list 1.

At step 1416, browser 114A sends WTS server 144 a request to load a subsequent web page.

At step 1418, before loading the subsequent web page, via the socket connection, Master Applet 124A sends WTS server 144 a command, together with the URL, to inform WTS server 144 that the current web page has been unloaded.

At step 1420, WTS server 144 identifies the session for terminal 104A.

At step 1422, WTS server 144 locates the session list 1 and URL history list 1.

At step 1424, WTS server 144 issues a time stamp (unloading time) for indicating the time at which the command was received, and stores the URL and time stamp to URL history list 1.

At step 1426, Master Applet 124A disconnects the socket connection for the web page that has been unloaded.

Figure 15:
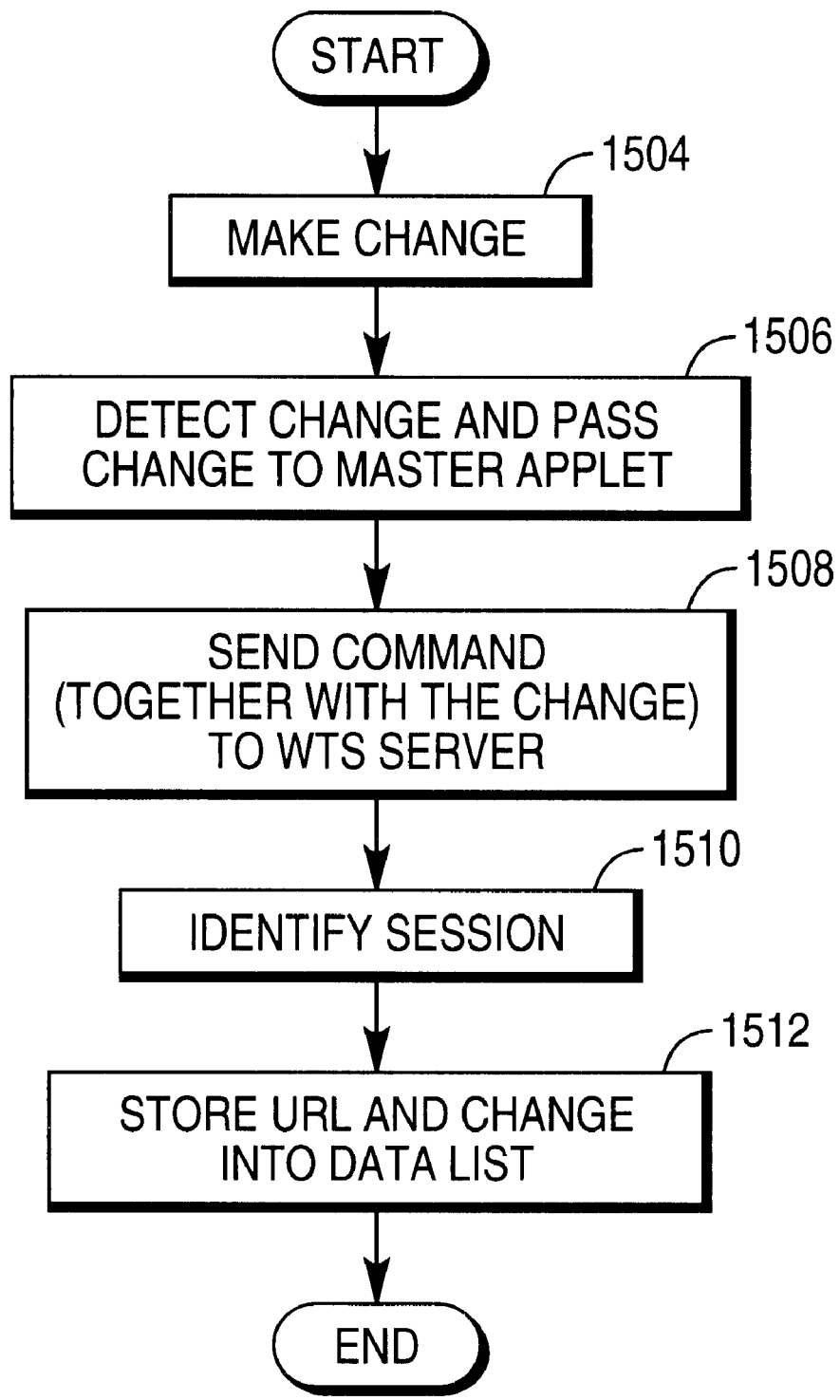
FIG. 15 shows a flowchart illustrating the operation of data tracking, in accordance with the present invention.

Referring to FIG. 15, there is shown a flowchart illustrating the operation of data tracking, in accordance with the present invention.

In the example shown in FIG. 15, it is assumed that: (1) a customer at terminal 104A is browsing web pages via browser 114A, (2) a session has been created for terminal 104A, (3) session list 1 and participant list 1 shown in FIG. 6 has been created for the session, (4) terminal 104N is one of the participants, (5) web page 1200 containing five data fields shown in FIG. 12A is displayed on terminals 104A and all participant terminals, (6) a bi-directional synchronization has been selected for terminal 104A and all participant terminals, (7) the (consumer) Master Applet, DTS Applets, and SessionID Applet are downloaded to terminal 104A and all participant terminals, (8) the DTS Applets contains five individual Applets: DTS Applet$_1$, DTS Applet$_2$, DTS Applet$_3$, DTS Applets$_4$, and DTS Applet$_5$, (9) these five individual DTS Applets are respectively responsible for displaying, monitoring and processing the events occurred on the five data fields of web page 1200 shown in FIG. 12A, (10) Master Applet 124A has established a dedicated socket connection to WTS server 144 for web page 1200 displayed on terminal 104A, and (11) the customer at terminal 104A wants to make changes to name field 1202 from Susan King to Sue Grant.

As shown in FIG. 15, at step 1504, the customer changes the name in name field 1502 from Susan King to Sue Grant.

At step 1506, in response to a loss of focus on name field 1202 or pressing the Enter key, DTS Applet, detects the change and passes the change to Master Applet 124A.

At step 1508, via the dedicated socket connection, Master Applet 124A sends WTS server 144 a command together with the change of name field 1202. Since this change is passed to WTS server 144 via the dedicated socket connection established for web page 1200, WTS server 144 is able to recognize the origin of the command, web page 1200, and the name field upon which the change was made.

At step 1510, WTS server 144 identifies the session created for terminal 104A.

At step 1512, WTS server 144 stores the URL and update of name field 1202 into data list 1.

It should be noted that the operation shown in FIG. 15 can be used to perform data tracking for the other four data fields on web page 1200, and to perform data tracking for all participant terminals.

Figure 16:
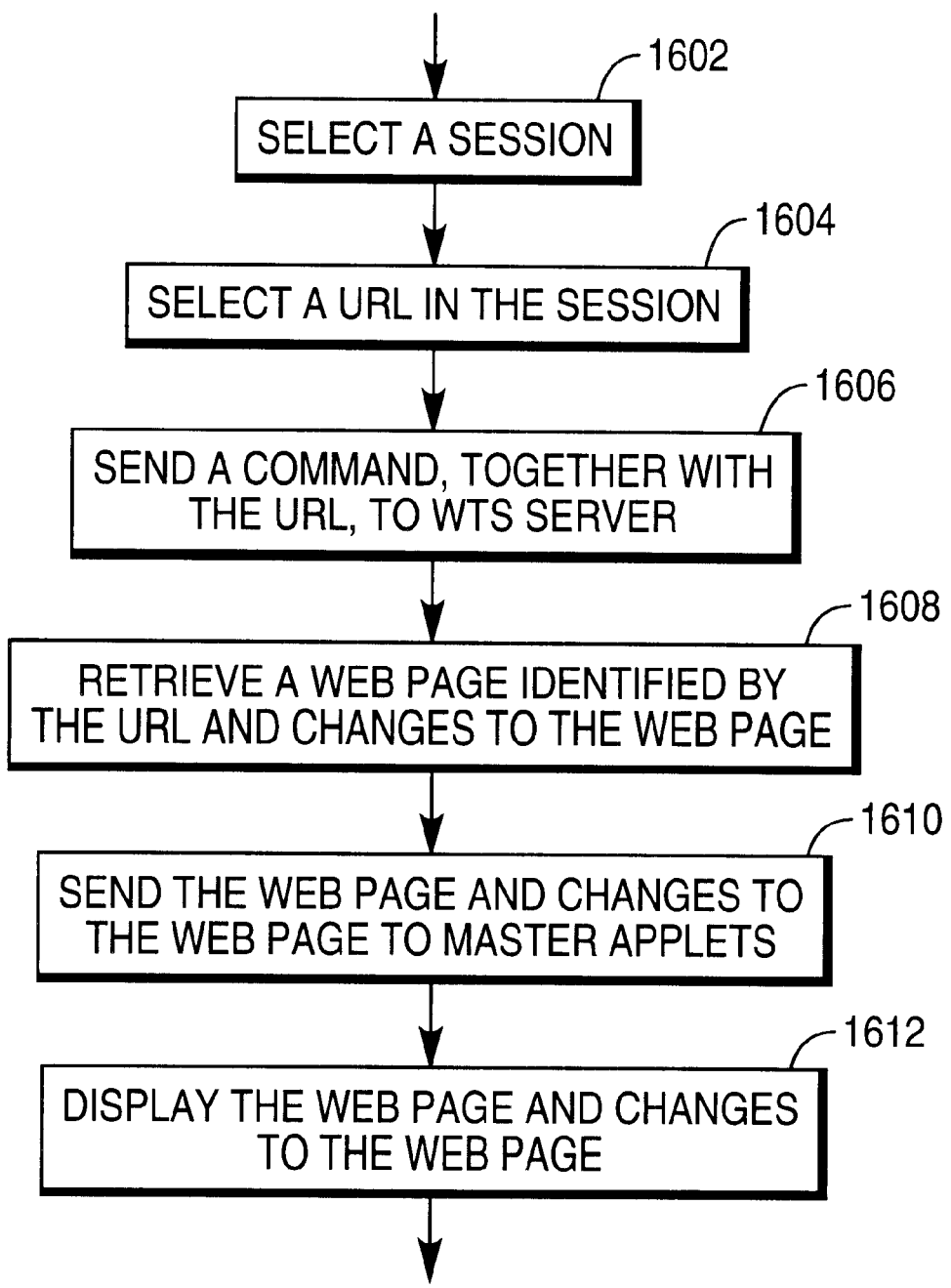
FIG. 16 shows a flowchart illustrating the operation of re-browsing a web page previously browsed in a session, in accordance with the present invention.

Referring to FIG. 16, there is shown a flowchart illustrating the operation of repeating browsing activities previously performed to a web page in a session, in accordance with the present invention.

In the example shown in FIG. 16, it is assumed that: (1) a user at terminal 104A had previously browsed web pages from consumer page repository 146 via browser 114A, (2) a session list 1 shown in FIG. 6 was created for browser 114A, (3) an agent is on duty at terminal 104N in a call center, and agent class has been assigned to browser 104N, (4) at browser 114N, the first and second browser instances for the agent as shown in FIG. 10 have been displayed, (5) via respective socket connections established by Master Applet 124N, the first and second browser instances for the agent as shown in FIG. 10 have been connected to WTS gateway 142, (6) Master Applets (124A and 124N), DTS Applets (126A and 126N) and SessionID Applets (128A and 128N) have been downloaded into terminals 104A and 104N respectively, (7) the agent has selected and joined the session created for browser 114A, (8) at browser 114N, the second browser instance for the agent as shown in FIG. 10 is being synchronized with browser 114A, and (9) bi-direction synchronization has been selected for browsers 114A and 114N.

At step 1602, the agent selects a session and reviews the URLs for all the web pages previously browsed by browser 114A in the selected session.

At step 1604, to display an individual web page previously browsed by browser 114A, the agent selects a URL from scrollable list box 818 (or scrollable list box 858) and double-clicks on it.

At step 1606, agent Master Applet 124N sends WTS server 144 a command together with the selected URL, via its respective socket connection.

At 1608, upon receiving the command, WTS server 144 retrieves the web page identified by the URL from HTTP server 152 (see FIG. 2). If the user browser previously performed any changes to the data fields of the web page, these changes are stored in data list 1 as shown in FIG. 6.

At 1610, WTS server 144 sends the web page to user and agent Master Applets 124A and 124N. If the user browser previously performed some changes to the data fields of the web page, WTS server 114 also sends these changes to user and agent Master Applets 124A and 124N.

At step 1614, agent and user Master Applets 124A and 124N instruct their respective browsers to display the web page previously browsed. If the user browser previously performed any changes to the data fields of the web page, the user and agent Master Applets receive the final data values of the changes and cause each data filed to display these changes on the web page.

Figure 17:
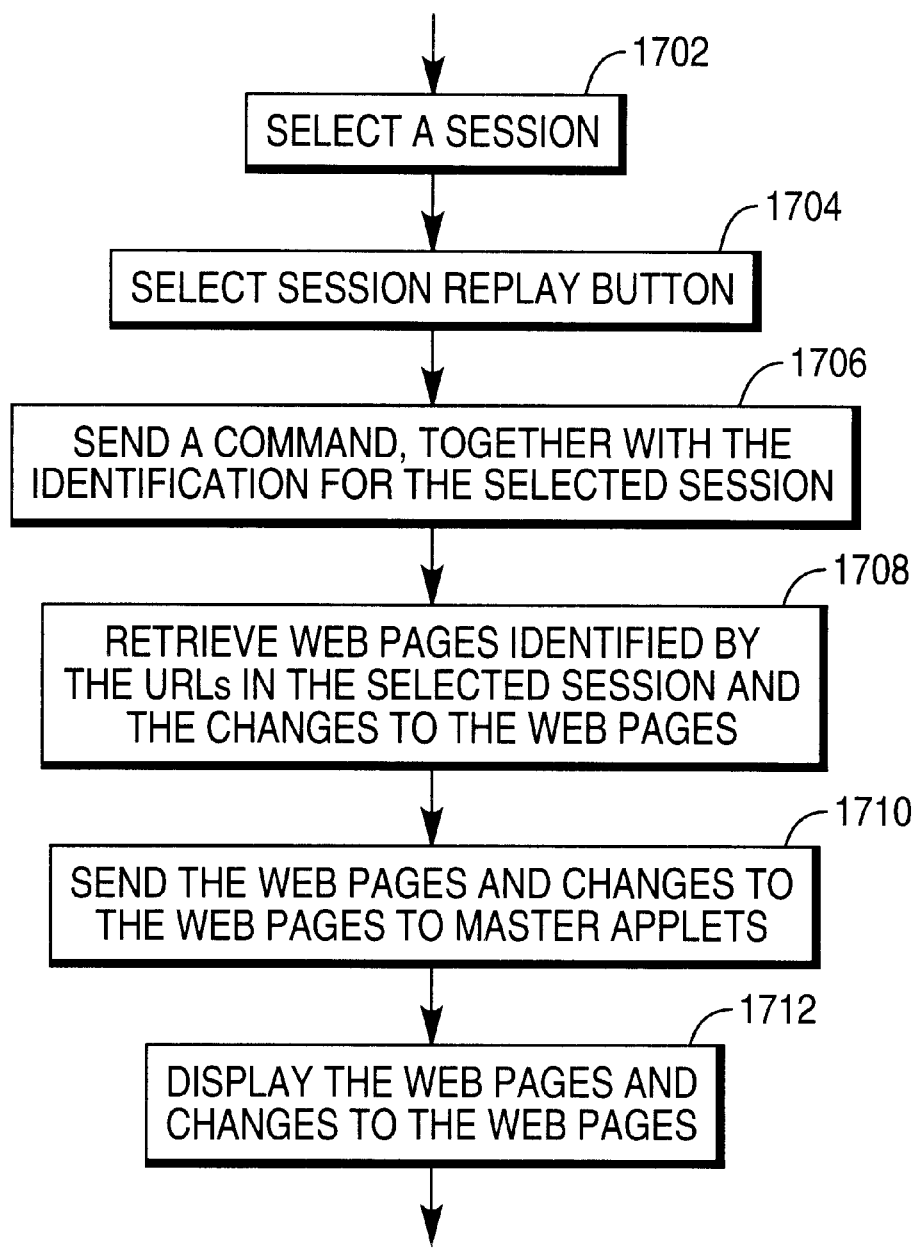
FIG. 17 shows a flowchart illustrating the operation of re-browsing all web pages previously browsed in a session, in accordance with the present invention.

Referring to FIG. 17, there is shown a flowchart illustrating the operation of replaying a browsing session, in accordance with the present invention.

In the example shown in FIG. 17, it is assumed that: (1) a user at terminal 104A had browsed web pages from consumer page repository 146 via browser 114A, (2) a session list 1 shown in FIG. 6 was created for browser 114A, (3) an agent is on duty at terminal 104N in a call center, and agent class has been assigned to browser 104N, (4) at browser 114N, the first and second browser instances for the agent as shown in FIG. 10 have been displayed, (5) via respective socket connections established by Master Applet 114N, the first and second browser instances for the agent as shown in FIG. 10 have been connected to WTS gateway 142, (6) Master Applets (124A and 124N), DTS Applets (126A and 126N) and SessionID Applets (128A and 128N) have been downloaded into terminals 104A and 104N respectively, (7) the agent has selected and joined the session created for browser 114A, (8) at browser 114N, the second browser instance for the agent as shown in FIG. 10 is being synchronized with browser 114A, and (9) bi-direction synchronization has been selected for browsers 114A and 114N.

At step 1702, the agent selects a session and reviews the URLs for all the web pages previously browsed by browser 114A in the selected session.

At step 1704, to re-browse all web pages previously browsed by browser 114A, the agent selects Session Replay button 820 in the agent session interface as shown in FIG. 10.

At step 1706, agent Master Applet 124N sends WTS server 144 a command together with the session selected, via its respective socket connection.

At 1708, upon receiving the command, WTS server 144 retrieves the web pages identified by the URLs in the selected session from HTTP server 152 (see FIG. 2). If the user browser previously performed any changes to the data fields of the web pages, these changes are stored in data list 1 as shown in FIG. 6.

At 1710, WTS server 144 sequentially sends the web pages to user and agent Master Applets 124A and 124N, in accordance with the loading and unloading times stored in URL history list 1 (see FIG. 6). If the user browser previously performed any changes to the data fields of the web pages, WTS server 144 also sends these changes to user and agent Master Applets 124A and 124N, in accordance with the loading and unloading times stored in data list 1.

At 1712, user and agent Master Applets 124A and 124N instruct their respective browsers 114A and 114N to displayed the web pages sent from WTS server 144. If the user browser previously performed any changes to the web pages to the data fields of the web pages, user and agent Master Applet 124A and 124N receive the final data values of the changes and cause each data field to display these changes on the web pages.

Since the loading time and unloading time of the URLs and the setting time for data fields are recorded in URL history list 1 and data list 1, if desired, all the web pages identified by the URLs and the activities performed to the data fields can be duplicated (loading the web page, setting data fields on the web page, and unloading the web page) according to the timing information. If desired, the sequence of URLs and data entry may be played proportionally faster or slower than the original session.

It should be noted that, in the above-described embodiments, all the Applets (Master Applets, DTS Applets, SessionID Applets, and Agent Applet) embedded into web pages are written using Java. However, some or all of these Applets can be written using a browser script language, such as Java Script. More specifically, some of the features provided by these Applets can be directly written into web pages using the browser script language, instead of using applet tags to link these Applets. When a web browser downloads a web page containing the Applets written in browser script language, it stores these Applets into the memory area of the terminal on which the web browser is running, and then initializes and invokes them. It should also be noted that a session could conceivably be replayed directly from database 156 in FIG. 1. In this scenario, the session has been terminated, but because all of the necessary data was stored in a database prior to the session being purged, an active session is not required to implement playback.

It can thus be seen that there has been provided by the present invention a new and useful mechanism to record the detailed browsing activities of an individual browser, and to reproduce a recorded set of browser activities at one or more browsers. The invention described herein has utility in a variety of applications including:

Consumer behavior analysis. The present invention can assist web developers or other interested parties in analyzing an individual consumer's web browsing activities. This function is comparable to the type of consumer behavior analysis currently performed in retail stores when analyzing the specific actions of a consumer as he or she walks through a store making selections.

Quality assurance. Currently telephone conversations between customers and agents in call centers are recorded for quality assurance purposes. Supervisors are thereafter able to listen to the recorded conversations to insure that customers are treated properly and that agents are following the appropriate procedures. When web conferencing is used in concert with a call center, it may be appropriate to record the synchronized browser activity between the call center agent and the end consumer. This recorded web session could be played back in synchronization with the voice record of the call.

Training. The present invention enables the presentation of a recorded sequence of web pages to a group of individuals, each utilizing a separate web browser. The ability to control the rate of playback would allow an instructor to slow down the presentation to answer questions, or to pause the presentation to take a break, provide comment or answer questions.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A method for repeating browsing activities performed during a web browsing session using a first web browser on a first client computer, said browsing activities including a series of requests for retrieving web pages from a web server, the method comprising the steps of:

(a) receiving at said web server an initial request from said first web browser for retrieving an initial page, said initial request indicating the beginning of said web browsing session;

(b) creating a session file at said web server for said web browsing session in response to said initial request;

(c) recording said browsing activities performed during said web browsing session to said session file;

(d) assigning a unique session ID to said session file;

(e) retrieving the browsing activities recorded during said web browsing session to said session file from said web server to a second web browser in response to a request from said second web browser identifying said session file by said session ID; and (f) repeating the recorded browsing activities at said second web browser; and wherein said web server includes multiple session files, each one of said multiple session files identified by a unique session ID, said multiple session files corresponding to multiple web browsing sessions occurring at said first client computer.

2. The method according to claim 1, further comprising the steps of:

(d) retrieving the recorded browsing activities to a third web browser;

(e) repeating the recorded browsing activities at said third web browser; and (f) synchronizing the browsing activities that are being repeated at said second and third web browsers.

3. The method according to claim 2, wherein:

said step of recording browsing activities performed using said first web browser includes the step of recording a time reference for said browsing activities; and said step of repeating the recorded browsing activities at said second web browser includes the step of repeating browsing activities according to said time references.

4. In a computer network including a network server and at least one client computer, a method for repeating browsing activities occurring during multiple web browsing sessions on said at least one client computer, the method comprising the steps of:

(a) creating a plurality of session files at said network server, each of said session files being associated with a respective one of said multiple web browsing sessions;

(b) recording the browsing activities for each of the multiple web browsing sessions into associated session files at the network server;

(c) assigning a unique session ID to each one of said session files;

(d) selecting one of said session files for replay, said selected session file being identified for selection by its assigned session ID;

(e) retrieving the selected session files to an administrative web browser; and (f) repeating the recorded browsing activities associated with said selected session file at said administrative web browser.

5. The method according to claim 4, wherein:

said step of recording the browsing activities for each of said web browsing sessions into associated session files at the network server includes the step of recording a time reference for said browsing activities with each session file; and said step of repeating the recorded browsing activities associated with said selected session file at said administrative web browser includes the step of repeating browsing activities according to the time reference associated with said selected session file.

* * * * *